United States Patent
Escott

(10) Patent No.: US 10,242,677 B2
(45) Date of Patent: Mar. 26, 2019

(54) SPEAKER DEPENDENT VOICED SOUND PATTERN DETECTION THRESHOLDS

(71) Applicant: Malaspina Labs (Barbados), Inc., Vancouver (CA)

(72) Inventor: Alexander Escott, Vancouver (CA)

(73) Assignee: MALASPINA LABS (BARBADOS), INC., Vancouver (CA)

( * ) Notice: Subject to any disclaimer, the term of this patent is extended or adjusted under 35 U.S.C. 154(b) by 87 days.

(21) Appl. No.: 14/835,192

(22) Filed: Aug. 25, 2015

(65) Prior Publication Data

US 2017/0061970 A1 Mar. 2, 2017

(51) Int. Cl.
| | | |
|---|---|---|
| G10L 17/20 | (2013.01) | |
| G10L 17/12 | (2013.01) | |
| G10L 15/14 | (2006.01) | |
| G10L 17/08 | (2013.01) | |
| G10L 17/04 | (2013.01) | |

(52) U.S. Cl.
CPC .............. *G10L 17/20* (2013.01); *G10L 17/04* (2013.01); *G10L 17/08* (2013.01); *G10L 17/12* (2013.01)

(58) Field of Classification Search
CPC ......... G10L 17/20; G10L 17/04; G10L 17/08; G10L 17/12
USPC .......................................................... 704/234
See application file for complete search history.

(56) References Cited

U.S. PATENT DOCUMENTS

| | | | | |
|---|---|---|---|---|
| 4,897,878 A | * | 1/1990 | Boll | G10L 15/20 704/233 |
| 4,918,732 A | * | 4/1990 | Gerson | G10L 15/00 704/233 |
| 6,940,973 B1 | * | 9/2005 | Yeap | H04M 3/18 375/285 |
| 8,239,194 B1 | * | 8/2012 | Paniconi | G10L 21/0216 381/71.1 |
| 2007/0208263 A1 | * | 9/2007 | John | A61B 5/0452 600/509 |
| 2008/0188763 A1 | * | 8/2008 | John | A61B 5/0452 600/516 |
| 2009/0154726 A1 | * | 6/2009 | Taenzer | G10L 25/78 381/94.1 |
| 2013/0289754 A1 | * | 10/2013 | Lehtiniemi | G10L 21/0216 700/94 |

(Continued)

*Primary Examiner* — Edwin S Leland, III
(74) *Attorney, Agent, or Firm* — Fernando & Partners LLP; Bejan Hafezzadeh

(57) ABSTRACT

Various implementations disclosed herein include a training module configured to determining a set of detection normalization threshold values associated with speaker dependent voiced sound pattern (VSP) detection. In some implementations, a method includes obtaining segment templates characterizing a concurrent segmentation of a first subset of a plurality of vocalization instances of a VSP, each segment template provides a stochastic characterization of how a particular portion of the VSP is vocalized by a particular speaker; generating a noisy segment matrix using a second subset of the plurality of vocalization instances of the VSP, wherein the noisy segment matrix includes one or more noisy copies of segment representations of the second subset; scoring segments from the noisy segment matrix against the segment templates; and determining detection normalization threshold values at two or more known SNR levels for at least one particular noise type based on a function of the scoring.

16 Claims, 11 Drawing Sheets

(56) References Cited

U.S. PATENT DOCUMENTS

| | | | |
|---|---|---|---|
| 2013/0289992 A1* | 10/2013 | Harada | G10L 15/20 |
| | | | 704/249 |
| 2015/0009073 A1* | 1/2015 | Keller, III | F41A 17/06 |
| | | | 342/450 |
| 2016/0027438 A1* | 1/2016 | Chu | G10L 15/02 |
| | | | 704/233 |
| 2017/0061970 A1* | 3/2017 | Escott | G10L 17/20 |

* cited by examiner

SPEAKER DEPENDENT VOICED SOUND PATTERN DETECTION THRESHOLDS

TECHNICAL FIELD

The present disclosure relates to audible signal processing, and in particular, to detecting a voiced sound pattern spoken by a particular speaker in noisy audible signal data.

BACKGROUND

The ability to recognize a voiced sound pattern (e.g., a keyword or a phrase), as vocalized by a particular speaker, is a basic function of the human auditory system. However, this psychoacoustic hearing task is difficult to reproduce using previously known machine-listening technologies because spoken communication often occurs in adverse acoustic environments that include ambient noise, interfering sounds, and background chatter of other speakers. The problem is further complicated because there is often variation in how a particular speaker vocalizes the same voiced sound pattern (VSP) in different instances. Nevertheless, as a hearing task, the unimpaired human auditory system is able recognize VSPs vocalized by a particular speaker effectively and perceptually instantaneously.

As a previously known machine-listening process, recognition of a VSP as vocalized by a particular speaker includes detecting and then matching a VSP to the vocal characteristics of the particular speaker. Known processes that enable detection and matching are computationally complex, use large memory allocations, and yet still remain functionally limited and highly inaccurate. One persistent problem includes an inability to sufficiently train a detection and matching system using previously known technologies. In particular, previously known technologies are limited to using a single vocalization instance at a time during the training process, because the processes employed cannot jointly utilize multiple vocalization instances without excessive multiplicative increases in computational complexity and memory demands. However, a single vocalization instance does not provide a sufficient amount of information to reliably train a VSP detection module.

Due to the computational complexity and memory demands, previously known VSP detection and speaker matching processes are characterized by long delays and high power consumption. In turn, these processes are undesirable for low-power, real-time and/or low-latency devices, such as hearing aids and mobile devices (e.g., smartphones, wearables, etc.). Also, the performance of previously available systems disproportionally deteriorates in response to signal-to-noise ratio (SNR) deterioration.

SUMMARY

Various implementations of systems, methods and devices within the scope of the appended claims each have several aspects, no single one of which is solely responsible for the attributes described herein. After considering this disclosure those of ordinary skill in the art will understand how the aspects of various implementations are used to enable speaker dependent voice activity detection (SDVA). In accordance with various implementations, SDVA enables a device to detect a user selected keyword or phrase (e.g., a voiced sound pattern, VSP) in a continuous stream of audio data spoken by the specific user, and to the exclusion of other speakers. In some implementations, a SDVA system includes a training module and a detection module. The detection module scores how well subsequently received portions of audible signal data match keyword characterizations that are used as the basis of one or more detection (and/or matching) threshold metrics. The training module allows a user to provide multiple examples of a keyword (e.g., a VSP) that are used to enable the detection module with the one or more detection (and/or matching) threshold metrics. Identifying features of the keyword examples are then extracted and characterized by the training module. In various implementations, the training module includes systems, methods and/or devices configured to produce a set of detection normalization threshold values based on multiple signal-to-noise ratio (SNR) values that characterize speaker dependent VSP detection criteria.

Various implementations disclosed herein include a training module configured to determining a set of detection normalization threshold values associated with speaker dependent voiced sound pattern (VSP) detection. In some implementations, a method includes obtaining segment templates characterizing a concurrent segmentation of a first subset of a plurality of vocalization instances of a VSP, each segment template provides a stochastic characterization of how a particular portion of the VSP is vocalized by a particular speaker; generating a noisy segment matrix using a second subset of the plurality of vocalization instances of the VSP, wherein the noisy segment matrix includes one or more noisy copies of segment representations of the second subset; scoring segments from the noisy segment matrix against the segment templates; and determining detection normalization threshold values at two or more known SNR levels for at least one particular noise type based on a function of the scoring.

In some implementations, each of the plurality of vocalization instances of the VSP has vocal characteristics of the particular speaker. In some implementations, the second subset is substantially independent of the first subset.

In some implementations, obtaining the set of segment templates includes selecting two or more related segments within a respective segment position across the concurrent segmentation of the first subset of the plurality of vocalization instances of the VSP; and, determining the respective segment template by determining a function of spectral features of the selected two or more related segments.

In some implementations, generating the noisy segment matrix includes segmenting the second subset of the plurality of vocalization instances of the VSP in order to generate test-training segments; and generating one or more noisy copies of each of the test-training segments by at least one of adding noise at one or more signal-to-noise (SNR) levels and adding noise of one or more noise types to each of the test-training segments. In some implementations, segmenting the second subset of the plurality of vocalization instances of the VSP includes segmenting a single test-training VSP vocalization instance into the same number of segments, $N_s$, as in concurrent segmentation of the first subset. In some implementations, segmenting the second subset of the plurality of vocalization instances of the VSP includes converting the $N_s$ segments into a spectral feature format that is compatible with the spectral feature format used to generate the concurrent segmentation of the first subset.

In some implementations, scoring segments from the noisy segment matrix against the segment templates includes generating raw score match probabilities as a function of one or more statistical similarity characterizations between noisy copies of segment representations and the segment templates. In some implementations, generating a raw score match probability includes determining the inverse Euclidian distance between a particular noisy copy of a segment representation and a particular segment template. In some implementations, the inverse Euclidian distance is determined between respective vector sets representing a particular noisy copy of a segment representation and a particular segment template. In some implementations, scoring segments from the noisy segment matrix against the segment templates includes generating a raw score posteriorgram, wherein the raw score posteriorgram includes match probabilities between noisy copies of segment representations and the segment templates. In some implementations, generating raw score match probabilities includes generating an accumulated score for each segment template for each combination of SNR level and noise type. In some implementations, scoring segments from the noisy segment matrix against the segment templates includes generating unbiased scores from the raw score match probabilities at a number of SNR levels for at least one particular noise type by subtracting a windowed mean of an accumulated score from the accumulated score.

In some implementations, determining detection normalization threshold values at two or more known SNR levels for at least one particular noise type based on a function of the scoring includes selecting a respective unbiased score for each of two or more SNR levels; identifying a corresponding peak in each respective unbiased score; and determining a respective sigmoid center anchor at as a function of the corresponding peak value for each SNR, wherein each detection normalization threshold value includes a respective sigmoid center anchor.

Some implementations include a system provided to determine a set of detection normalization threshold values associated with speaker dependent voiced sound pattern (VSP) detection. In some implementations, the system includes a raw scoring module configured to generate match probabilities as a function of one or more statistical similarity characterizations between noisy copies of segment representations and the segment templates, wherein the segment templates characterize a concurrent segmentation of a first subset of a plurality of vocalization instances of a VSP, and each of the segment representations are associated with a second subset of the plurality of vocalization instances of the VSP; an unbiased scoring module configured to generate unbiased scores from the raw score match probabilities at a number of (signal-to-noise) SNR levels of at least one particular noise type; and a sigmoid center set module configured to determine detection normalization threshold values at two or more known SNR levels for at least one particular noise type based on the unbiased scores.

Some implementations include a method of detecting whether or not a voiced sound pattern (VSP) as vocalized by a particular speaker is present in audible signal data. In some implementations, the method includes obtaining a set of segment templates characterizing a concurrent segmentation of a first subset of a plurality of vocalization instances of a VSP, wherein each segment template provides a stochastic characterization of how a particular portion of the VSP is vocalized by a particular speaker; scoring segments of audible signal data against the segment templates in order to generate a corresponding match score for each segment position; determining a corresponding detection normalization threshold value for each segment position of the audible signal data based on a respective (signal-to-noise) SNR estimate value associated with each segment of the audible signal data; and normalizing the match score for each segment position based on a function of the detection normalization threshold value.

Some implementations include a system provided to determine whether or not a voiced sound pattern (VSP) as vocalized by a particular speaker is present in audible signal data. In some implementations, the system includes a raw scoring module configured to generate match probabilities as a function of one or more statistical similarity characterizations between noisy copies of segment representations and the segment templates, wherein the segment templates characterize a concurrent segmentation of a first subset of a plurality of vocalization instances of a VSP, and each of the segment representations are associated with a second subset of the plurality of vocalization instances of the VSP; an unbiased scoring module configured to generate unbiased scores from the raw score match probabilities at a number of (signal-to-noise) SNR levels of at least one particular noise type; and a sigmoid center control module configured to interpret SNR-dependent sigmoid center anchors in order to generate a sigmoid center value associated with a particular SNR estimate value for each segment position of the audible signal data.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
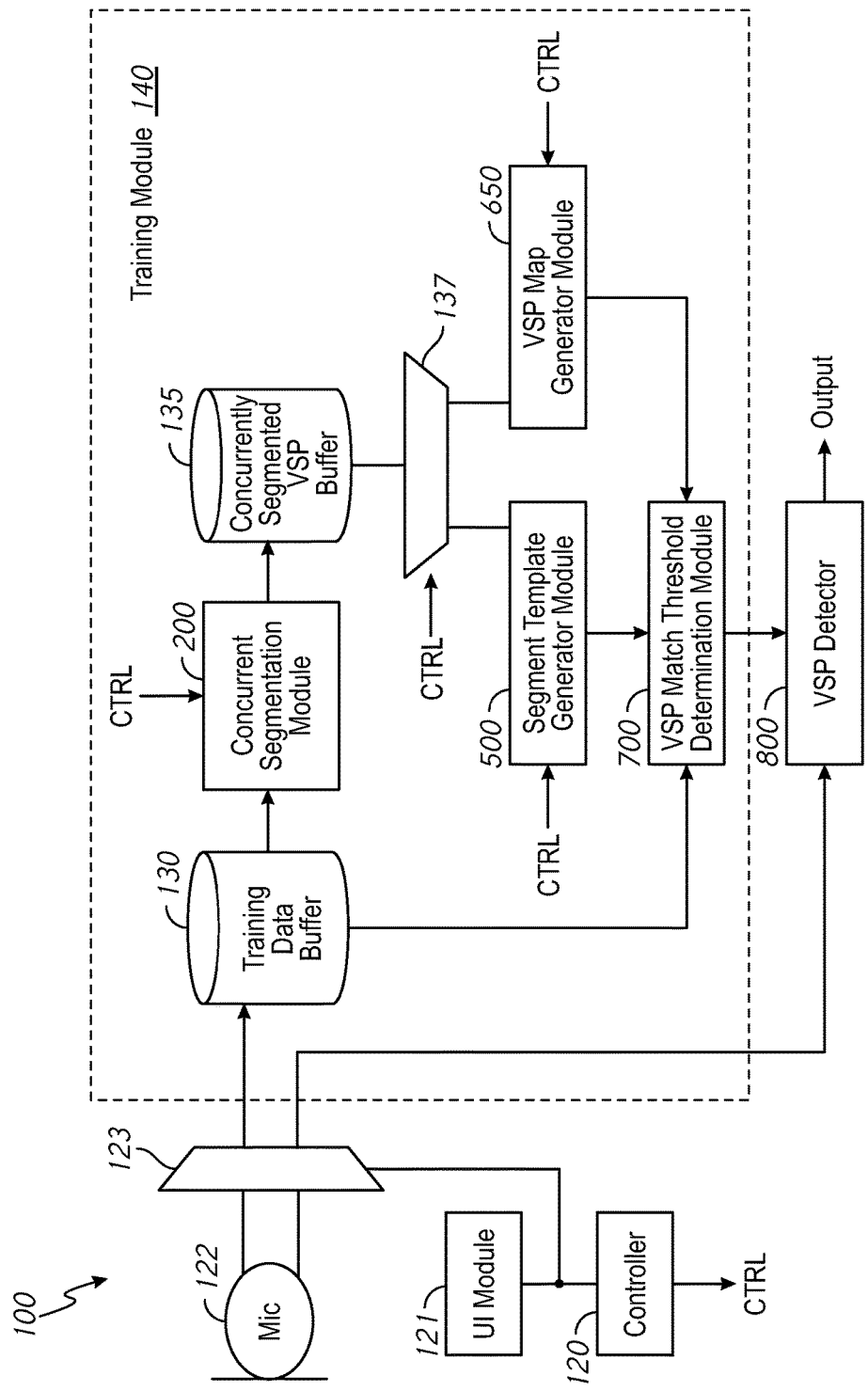
FIG. 1 is a block diagram of a VSP detection system configured to detect VSPs as vocalized by a particular speaker in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the drawings.

DETAILED DESCRIPTION

Numerous details are described herein in order to provide a thorough understanding of the example implementations illustrated in the accompanying drawings. However, the invention may be practiced without many of the specific details. And, well-known methods, components, and circuits have not been described in exhaustive detail so as not to unnecessarily obscure more pertinent aspects of the implementations described herein.

Previously known technologies that enable detection and matching are computationally complex, demand large memory allocations, and yet still remain functionally limited and highly inaccurate. As noted above, these previously known technologies are limited to using a single vocalization instance of a VSP at a time during the training process, because the processes cannot jointly use multiple vocalization instances without excessive multiplicative increases in computational complexity and memory demands. However, a single vocalization instance does not provide a sufficient amount of information to reliably train a VSP detection system—especially when successful VSP detection is intended to be limited to vocalizations of a particular speaker (e.g., speaker dependent detection).

By contrast, various implementations disclosed herein include a training module configured to produce a set of segment templates from a concurrent segmentation of multiple similar instances of a VSP vocalized by a particular speaker, who is identifiable by a corresponding set of vocal characteristics. In some implementations, within the concurrent segmentation, each of the instances of the VSP is divided into the same number of segments ($N_S$). Having the same number of segments ($N_S$) for each VSP vocalization instances enables the generation and utilization of a common set of segment templates for the VSP, which reduces memory allocation, processor usage, and ultimately power consumption. Moreover, information produced from multiple instances of a VSP vocalized by a particular speaker characterizes how the particular speaker vocalizes the VSP and how those vocalizations may vary between instances. Each segment template provides a stochastic characterization of how each of one or more portions of a VSP is vocalized by the particular speaker in accordance with the corresponding set of vocal characteristics. Additionally, in various implementations, the training module includes systems, methods and/or devices configured to produce a set of VSP segment maps that each provide a quantitative characterization of how a respective segment of the plurality of vocalization instances varies in relation to a corresponding one of a set of segment templates.

FIG. 1 is a block diagram of a VSP detection system 100 provided to detect a VSP as vocalized by a particular speaker in accordance with some implementations. In various implementations, the VSP detection system 100 is included in a device or system enabled with one or more machine-listening applications, such as a computer, a laptop computer, a tablet device, a mobile phone, a smartphone, a wearable (e.g., a smart watch) a gaming device, and a hearing aid. So while pertinent features are illustrated, those of ordinary skill in the art will appreciate from the present disclosure that various other features have not been illustrated for the sake of brevity and so as not to obscure more pertinent aspects of the implementations disclosed herein. Also, those of ordinary skill in the art will appreciate from the present disclosure that the functions of the modules described below can be combined into one or more modules and/or further sub-divided into additional sub-modules; and, that the modules described below are provided as merely one example configuration of the various aspects and functions described herein.

To that end, as a non-limiting example, in some implementations, the VSP detection system 100 includes a microphone 122, a multiplexer (MUX) 123, a user interface (UI) module 121, a controller 120, a VSP detector module 800, and a training module 140. As shown in FIG. 1, the microphone 122 is selectively connectable to both the training module 140 and VSP detector module 800 through the MUX 123. In some implementations, the MUX 123 is used to coordinate switching between a training mode and a detection mode. In the training mode, the MUX 123 is used to couple the microphone 122 to the training module 140. In a detection mode, the MUX 123 is used to couple the microphone 122 to the VSP detector module 800. Mode-based selection and switching are enabled by the controller 120. In some implementations, the training module 140 is provided separately.

In some implementations, mode selection and/or switching is responsive to a user input received through the UI module 121. In some implementations, the UI module 121 includes one or more processors, one or more types of memory, a display and/or other user interface components such as a keyboard, a touch screen display, a mouse, a track-pad, a digital camera and/or any number of supplemental devices to add functionality.

In some implementations, the microphone 122 (e.g., one or more audio sensors) is provided to receive and convert sound into an electronic signal that can be stored in a non-transitory memory, and which is referred to as audible signal data herein. In many situations, the audible signal is captured from an adverse acoustic environment, and thus likely includes ambient noise, interfering sounds and background chatter in addition to the target voice of interest. In many applications, a received audible signal is an ongoing or continuous time series. In turn, in some implementations, a times series conversion module (e.g., windowing module 211 shown in FIG. 2) is configured to generate two or more temporal frames of audible signal data from a stream of audible signal data. Each temporal frame of the audible signal data includes a temporal portion of the audible signal received by the microphone 122.

In some implementations, the VSP detector module 800 uses at least one detection threshold metric (e.g., speaker dependent VSP feature characterizations), provided by the training module 140, for detecting and matching the VSP as vocalized by a particular speaker. The at least one detection threshold metric is used to score how well subsequently received portions of an audible signal match extracted speaker dependent VSP features that have been extracted from multiple instances of the VSP during a training mode. In other words, the training module 140 allows a user to provide multiple examples of a VSP that are used to enable the VSP detection module 800 with a more reliable set of one or more detection normalization threshold values. As described below with reference to FIGS. 5 and 6, in some implementations, a set of one or more detection normalization threshold values includes SNR-dependent sigmoid center anchors values generated by scoring a test vocalization instance against segment templates generated from a concurrent segmentation.

In some implementations, the training module 140 includes a training data buffer 130, a concurrent segmentation module 200, a concurrently segmented VSP buffer 135, an optional MUX 137, a segment template generator module 500, a VSP map generator module 650, and a VSP match (e.g., detection) threshold determination module 700.

In some implementations, the training data buffer 130 is provided to store and receive a number of similar vocalization instances of a VSP provided by a user—who in some implementations is first authenticated. As would be understood by those of ordinary skill in the art, two separate words or phrases (e.g., "apple" and "orange") are not considered similar vocalization instances of the same VSP because they do not have at least loosely matching spectral components. However, two separate utterances of the same word by the same speaker can be considered similar vocalization instances, when the two separate utterances are not intentionally spoken with exceeding amounts of variation. In such cases, even accounting for natural variation is a speaker's voice, the two separate utterances of the same word have at least loosely matching spectral components that are a function of the speaker's vocalization system.

As described below with reference to FIG. 2, the concurrent segmentation module 200 is configured to jointly and simultaneously segment multiple similar vocalization instances of the VSP in order to produce a concurrent segmentation applicable across all of the multiple similar vocalization instances of the VSP (included in the concurrent segmentation). In other words, each of the multiple similar vocalization instances of the VSP is segmented into the same number of segments ($N_S$) as the other vocalization instances. In accordance with the concurrent segmentation, corresponding segments from two or more respective vocalization instances are aligned and mapped to one another based on matched spectral features, and not necessarily based on specific and matching temporal points. The concurrent segmentation module 200 then stores the concurrent segmentation of the multiple similar vocalization instances of the VSP in the concurrently segmented VSP buffer 135.

As described in greater detail below with reference to FIGS. 3 and 4, in some implementations, the segment template generator module 500 and the VSP map generator module 650 are configured to produce additional speaker dependent VSP characterizations using the concurrent segmentation stored in the concurrently segmented VSP buffer 135. In turn, as described in greater detail below with reference to FIGS. 5 and 6, the VSP match threshold determination module 700 utilizes the VSP characterizations provided by the segment template generator module 500 and the VSP map generator module 650, as well as additional raw training data that was not included in the concurrent segmentation, in order to produce a more reliable set of one or more detection normalization threshold values suitable for the VSP detection module 800.

The controller 120 is coupled to each of the aforementioned in order to coordinate the operation of the VSP detection system 100. More specifically, the controller 120 is connected to provide the training module 140 with control commands and/or instructions that direct the training module 140 to produce one or more detection normalization threshold values based on a concurrent segmentation of multiple instances of a VSP as vocalized by a particular speaker. The controller 120 is also coupled to the MUX 123 in order to effectuate mode-based selection and switching, as described above. The VSP detector module 800 is configured to use keyword characterizations to score how well subsequently received portions of an audible signal match the speaker dependent keyword characterizations that are used as the basis of one or more detection (and/or matching) normalization threshold values (provided by the training module 140).

Figure 2:
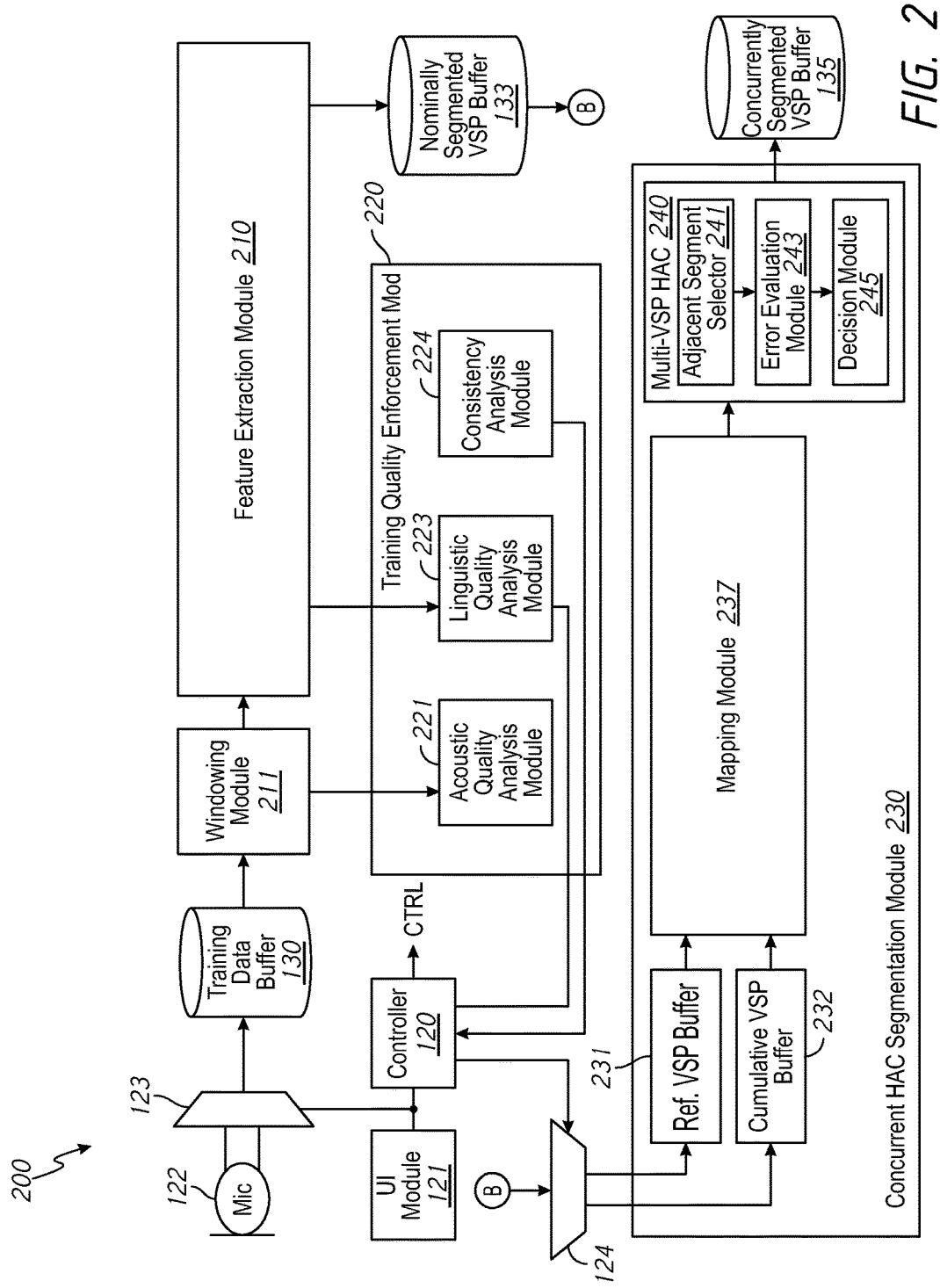
FIG. 2 is a block diagram of a segmentation module configured to determine a concurrent segmentation of multiple instances of a VSP in accordance with some implementations.

FIG. 2 is a block diagram of the concurrent segmentation module 200 included in the VSP detection system 100 of FIG. 1 in accordance with some implementations. Portions of FIG. 2 are adapted from FIG. 1, and so elements common to each include common reference numbers, and only the differences between FIGS. 1 and 2 are described herein for the sake of brevity. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the concurrent segmentation module 200 includes a windowing module 211, a feature extraction module 210, a training quality enforcement module 220, and a concurrent HAC (hierarchical agglomerative clustering) segmentation module 230. The concurrent segmentation module 200 also includes a training data buffer 130, a nominally segmented VSP buffer 133, a reference VSP buffer 231, a cumulative VSP buffer 232, and a concurrently segmented VSP buffer 135.

In some implementations, the windowing module 211 is configured to mark and separate a set of one or more temporal frames of each of the plurality of vocalization instances (e.g., audible signal data) of the VSP for frame boundary times $t_1, t_2, \ldots, t_n$. In some implementations, each temporal frame is optionally conditioned by a pre-filter (not shown). For example, in some implementations, pre-filtering includes band-pass filtering to isolate and/or emphasize the portion of the frequency spectrum typically associated with human speech. In some implementations, pre-filtering includes pre-emphasizing portions of one or more temporal frames of the audible signal data in order to adjust the spectral composition of the one or more temporal frames of audible signal data. Additionally and/or alternatively, in some implementations, the windowing module 211 configured to retrieve the audible signal data from a non-transitory memory (e.g., training data buffer 130). Additionally and/or alternatively, in some implementations, pre-filtering includes filtering the received audible signal using a low-noise amplifier (LNA) in order to substantially set a noise floor. In some implementations, a pre-filtering LNA is arranged between the microphone 122 and the MUX 123. Those of ordinary skill in the art will appreciate that numerous other pre-filtering techniques may be applied to the received audible signal data, and those discussed are merely examples of numerous pre-filtering options available.

In some implementations, a MUX (not shown) is provided between the windowing module 211 and the feature extraction module 210. The MUX is provided in order to regulate and/or operation of the feature extraction module 210 while training data is assessed for acoustic acceptability by the training quality enforcement module 220. In some implementations, until a sufficient amount of acoustically acceptable training data is obtained, the controller 120 prevents transfer of training data from the windowing module 211 to the feature extraction module 210 by sending a control signal to the MUX.

In some implementations, the feature extraction module 210 is configured to identify and extract spectral features from a frequency domain representation for each of the one or more temporal frames in each respective set corresponding to the plurality of vocalization instances of the VSP. In some implementations, the feature extraction module 210 is configured to select 19 MFCCs (mel-frequency cepstrum coefficients) per frame for each of the plurality of vocalization instances of the VSP. In some implementations, the feature extraction module 210 is configured to assess and obtain the characteristics of spectral features (e.g., a feature characterization set) in each of the frequency domain representations of the one or more frames of the audible signal data. In various implementations, a feature characterization set includes any of a number and/or combination of signal processing features, such as spectra, cepstra, mel-scaled cepstra, pitch, a signal-to-noise ratio (SNR), a voice strength estimate, and a voice period variance estimate. In some implementations, for example, the feature extraction module 210 includes one or more sub-modules that are configured to analyze the frames in order to obtain spectral feature characterization data. In some implementations, selected frame-wise MFCCs are stored in the nominally segmented VSP buffer 133 and indexed by respective vocalization instance identifiers corresponding to the plurality of vocalization instances of the VSP.

Additionally and/or alternatively, for example, in various implementations, feature extraction module 210 includes a cepstrum analysis sub-module, a pitch estimation sub-module, a mel-frequency cepstrum coefficients (MFCC) analysis sub-module, a SNR estimation sub-module, a voice strength estimation sub-module, and a voice period variance estimation sub-module. Those of ordinary skill in the art will appreciate from the present disclosure that the functions of the aforementioned sub-modules can be combined into one or more sub-modules and/or further sub-divided into additional sub-modules and/or included in portions of the training quality enforcement module 200; and, that the aforementioned sub-modules are provided as merely one example configuration of the various aspects and functions described herein.

In some implementations, the cepstrum analysis sub-module is configured to determine the Fourier Transform (FFT) of the logarithm of a frequency domain representation of a temporal frame. In some implementations, the pitch estimation sub-module is configured to provide a pitch estimate of voice activity in an audible signal. As known to those of ordinary skill in the art, pitch is generally an estimation of a dominant frequency characterizing a corresponding series of glottal pulses associated with voiced sounds. As such, the pitch estimation sub-module is configured to identify the presence of regularly-spaced transients generally corresponding to glottal pulses characteristic of voiced speech. In some implementations, the transients are identified by relative amplitude and relative spacing. In some implementations, the mel-frequency cepstrum coefficients (MFCCs) analysis sub-module is configured to provide a representation of the short-term power spectrum of a frequency domain representation of a temporal frame. Typically, the short-term power spectrum is based on a linear cosine transform on a log power spectrum on a non-linear mel scale of frequency. In some implementations, the SNR estimation sub-module is configured to estimate the signal-to-noise ratio in one or more of the frequency domain representations of the temporal frames. In some implementations, the voice strength estimation sub-module is configured to provide an indicator of the relative strength of the target or dominant voice signal in a frame. In some implementations, the relative strength is measured by the number of detected glottal pulses, which are weighted by respective correlation coefficients. In some implementations, the relative strength indicator includes the highest detected amplitude of the smoothed inter-peak interval accumulation produced by an accumulator function. In some implementations, the voice period variance estimation sub-module is configured to estimate the pitch variance in one or more of the frequency domain representations of the temporal frames. In other words, the voice period variance estimator provides an indicator for each sub-band that indicates how far the period detected in a sub-band is from the dominant voice period P. In some implementations the variance indicator for a particular sub-band is determined by keeping track of a period estimate derived from the glottal pulses detected in that particular sub-band, and comparing the respective pitch estimate with the dominant voice period P.

In some implementations, the training quality enforcement module 220 includes an acoustic quality analysis module 221, a linguistic quality analysis module 223, and consistency analysis module 224. In some implementations, the acoustic quality analysis module 221 is configured to determine acoustic acceptability (e.g., amplitude, SNR, completeness, length, etc.). In some implementations, the linguistic quality analysis module 223 is configured to determine linguistic acceptability (e.g., spectrum shape, frequency content, spectral variation, etc.). In some implementations, the consistency analysis module 224 is configured to determine whether or not a function of the variation between DTW MFCCs and the MFCCs of the reference VSP vocalization instance breaches a threshold performance metric.

In some implementations, the concurrent HAC segmentation module 230 includes a mapping module 237 and a multi-VSP HAC module 240. The mapping module 237 is configured to determine respective frame-wise spectral feature distances between each of the cumulative VSP vocalization instances, stored in the cumulative VSP buffer 232, and the reference VSP vocalization instance, stored in the reference VSP buffer 231. Subsequently, the mapping module 237 is configured to perform dynamic time warping (DTW) on the distance matrix, and then use the DTW result to map spectral features of the cumulative VSP vocalization instances to spectral features of the VSP vocalization instance in order to produce a segment mapping. In some implementations, the multi-VSP HAC module 240 is configured to perform the modified HAC process, in accordance with various implementations, in order to adjust the segmentation of the plurality of vocalization instances of the VSP. To that end, in some implementations, the multi-VSP HAC module 240 includes an adjacent segment selector 241, an error evaluation module 243, and a decision module 245.

With continued reference to FIG. 2, in some implementations, the adjacent segment selector 241 determines whether or not the respective sets of the temporal frames of the plurality of vocalization instances of the VSP include an additional adjacent pair combination that has not yet been evaluated. In some implementations, the error evaluation module 243 determines a respective error value for each of the plurality of vocalization instances of the VSP as a function of merging the selected pair, and then determines a variance value as a function of the respective error values. In some implementations, the decision module 245 is configured to select the pair combinations that satisfy a merging criteria (e.g., error threshold) across at least the majority of the plurality of vocalization instances of the VSP.

Figure 3:
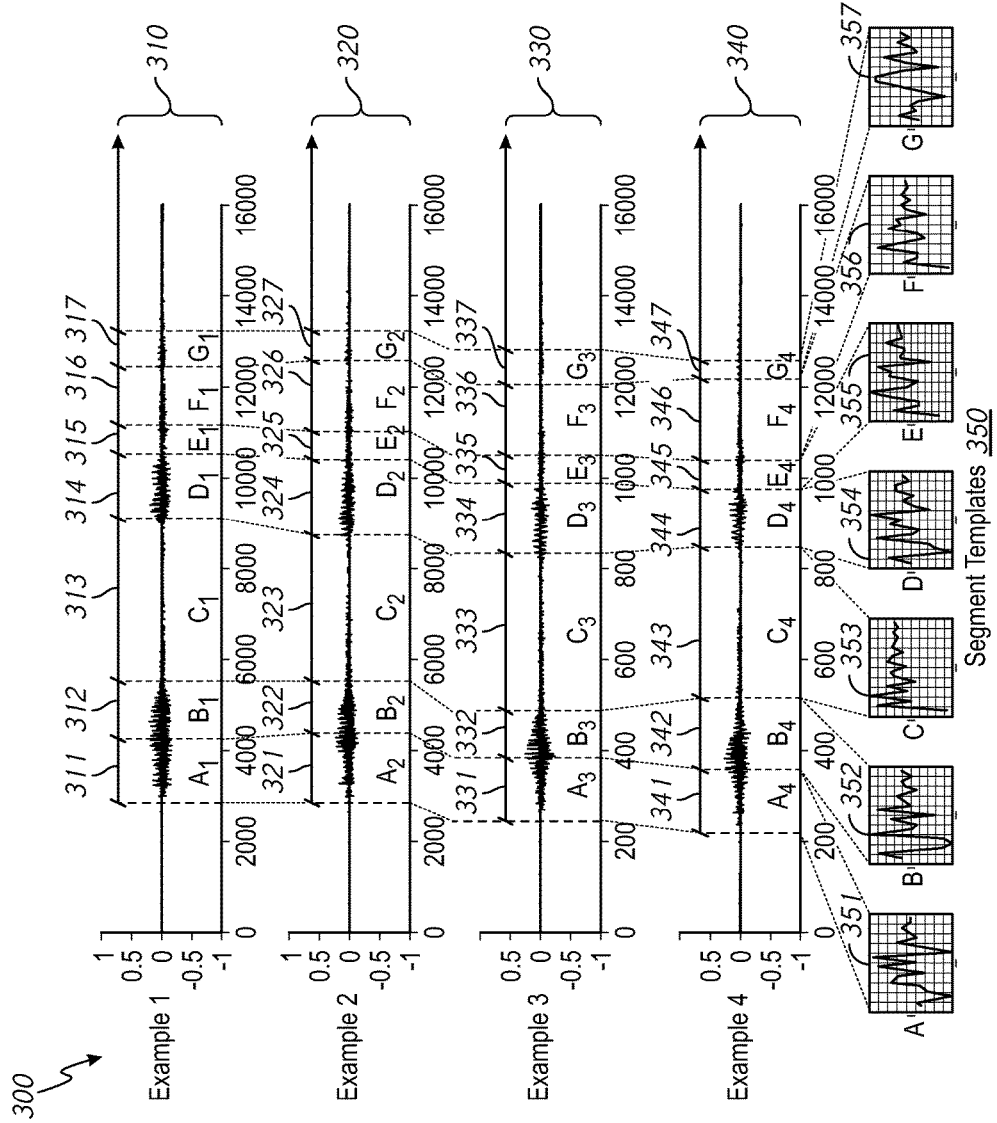
FIG. 3 is a performance diagram illustrating an example of a concurrent segmentation of multiple instances of a VSP in accordance with some implementations.

As an example, FIG. 3 is a performance diagram illustrating an example of a concurrent segmentation 300 of multiple instances of a VSP in accordance with some implementations—generated by the process described above with reference to FIG. 2. The concurrent segmentation 300 includes a plurality of vocalization instances of the VSP that have been jointly segmented. Each vocalization instances of the VSP in the concurrent segmentation 300 includes the same number of segments ($N_S$) as the other vocalization instances. However, in accordance with the concurrent segmentation 300, corresponding segments from two or more respective vocalization instances are aligned and mapped to one another based on matched spectral features, and not necessarily based on specific and matching temporal points or time markers.

As shown in the example provided in FIG. 3, the plurality of vocalization instances of the VSP includes four vocalization instances 310, 320, 330, 340. While four vocalization instances are illustrated in FIG. 3, those of ordinary skill in the art will appreciate from the present disclosure that any number of vocalization instances can be utilized in various implementations. In accordance with the process described above with reference to FIG. 2, each vocalization instance 310, 320, 330, 340 has been jointly segmented with the others into seven segments ($A_N$ to $G_N$). As such, the first vocalization instance 310 includes seven segments 311, 312, 313, 314, 315, 316, 317 ($A_1$, $B_1$, $C_1$, $D_1$, $E_1$, $F_1$, $G_1$). The second vocalization instance 320 includes seven segments 321, 322, 323, 324, 325, 326, 327 ($A_2$, $B_2$, $C_2$, $D_2$, $E_2$, $F_2$, $G_2$). The third vocalization instance 330 includes seven segments 331, 332, 333, 334, 335, 336, 337 ($A_3$, $B_3$, $C_3$, $D_3$, $E_3$, $F_3$, $G_3$). The fourth vocalization instance 340 includes seven segments 341, 342, 343, 344, 345, 346, 347 ($A_4$, $B_4$, $C_4$, $D_4$, $E_4$, $F_4$, $G_4$). In other words, the vocalization instances of the VSP have been segmented to include the same number of segments ($N_S$) as one another in accordance with the concurrent segmentation.

In some implementations, having the same number of segments ($N_S$) for each VSP enables the generation and utilization of a common set of segment templates 350 for the VSP, which reduces memory allocation, processor usage, and ultimately power consumption. Segment template A (351) is a function of the corresponding first segments ($A_n$) from each of the vocalization instances 310, 320, 330, 340. Segment template B (352) is a function of the corresponding second segments ($B_n$) from each of the vocalization instances 310, 320, 330, 340. Segment template C (353) is a function of the corresponding third segments ($C_n$) from each of the vocalization instances 310, 320, 330, 340. Segment template D (354) is a function of the corresponding fourth segments ($D_n$) from each of the vocalization instances 310, 320, 330, 340. Segment template E (355) is a function of the corresponding fifth segments $E_n$) from each of the vocalization instances 310, 320, 330, 340. Segment template F (656) is a function of the corresponding sixth segments ($F_n$) from each of the vocalization instances 310, 320, 330, 340. Segment template G (357) is a function of the corresponding seventh segments ($G_n$) from each of the vocalization instances 310, 320, 330, 340.

Figure 4:
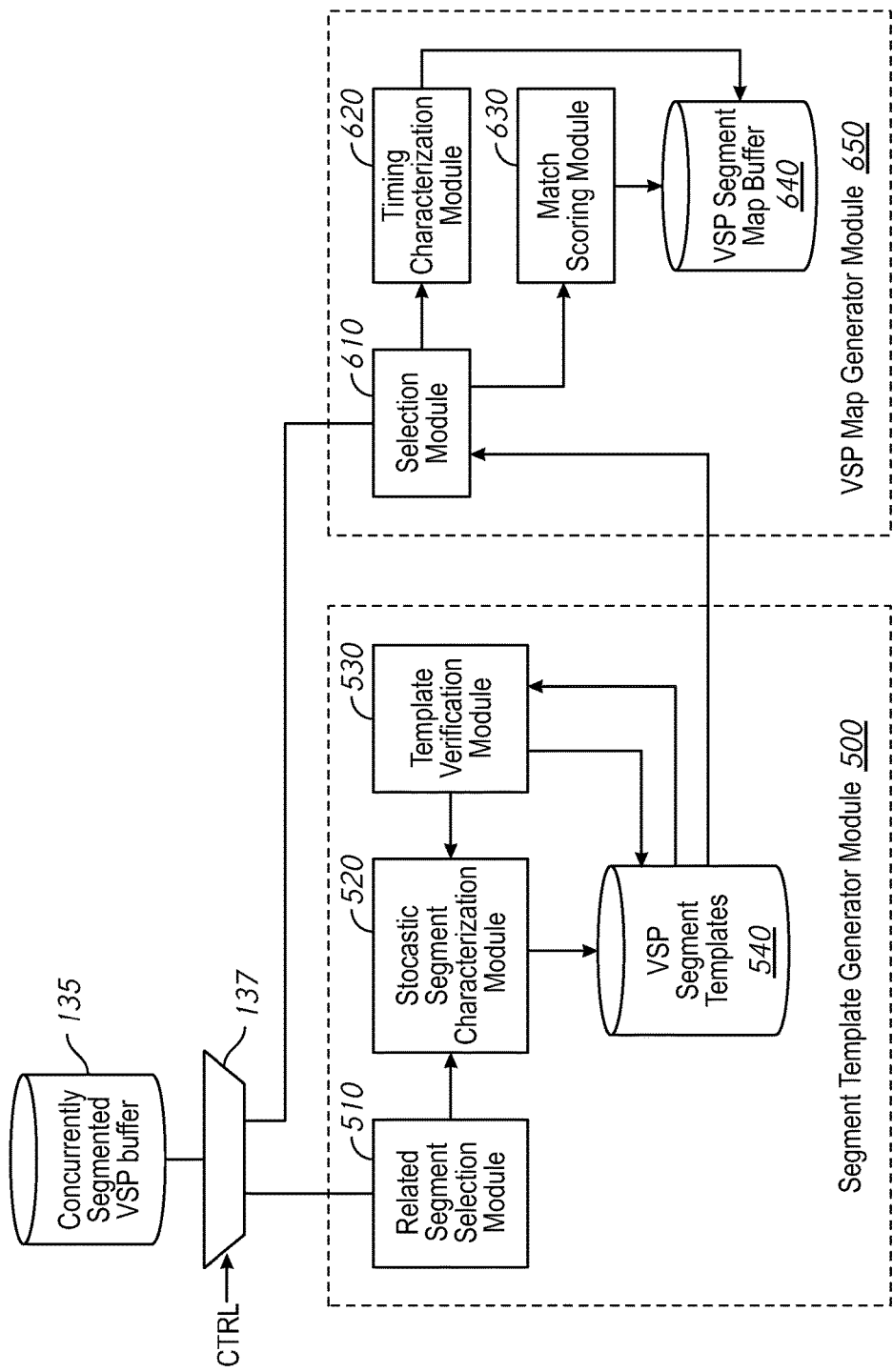
FIG. 4 is a block diagram of a segment template generation module in combination with a segment mapping module in accordance with some implementations.
Figure 5:
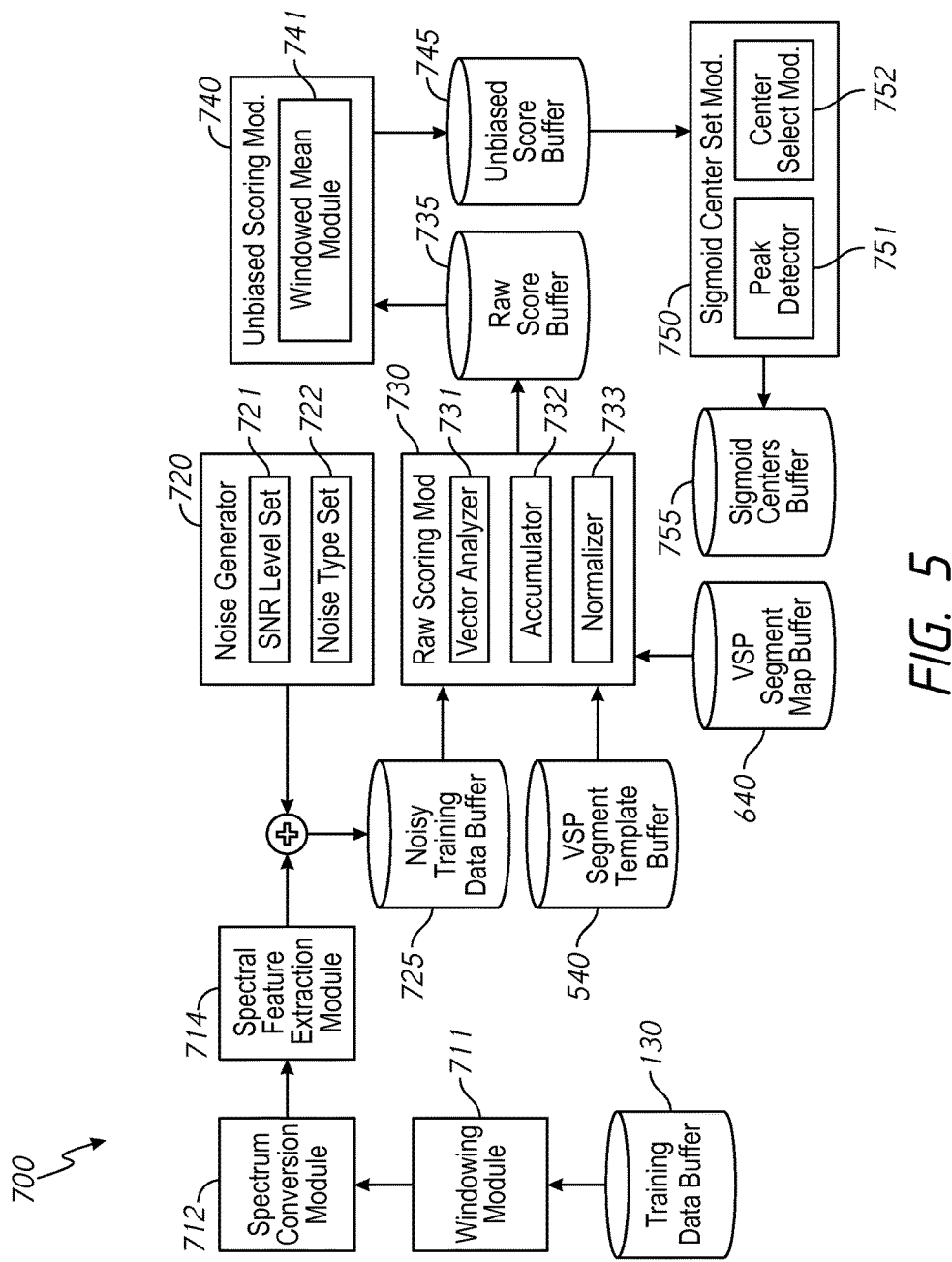
FIG. 5 is a block diagram of a VSP match threshold determination module in accordance with some implementations.

FIG. 4 is a block diagram of the segment template generation module 500 in combination with the VSP map generator module 650 in accordance with some implementations. Portions of FIG. 4 are adapted from FIG. 1, and so elements common to each include common reference numbers, and only the differences between FIGS. 1 and 4 are described herein for the sake of brevity. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the segment template generation module 500 includes a related segment selection module 510, a stochastic segment characterization module 520, an optional template verification module 530, and a VSP segment templates buffer 540. As also shown in FIG. 5, in some implementations, the VSP map generator module 650 includes a selection module 610, a timing characterization module 620, a match scoring module 630 and a VSP segment map buffer 640.

Referring to the segment template generation module 500, the related segment selection module 510 is configured to select two or more related segments from across a concurrent segmentation of multiple vocalization instances of a VSP. Related segments are used to generate a respective segment template. For example, with additional reference to FIG. 3, the related segment selection module 510 selects the respective third segments $C_1$, $C_2$, $C_3$, $C_4$ from the corresponding vocalization instances 310, 320, 330, 340 in order to generate segment template C (353). The related segment selection module 510 similarly selects related segments for the other segment templates A, B, D, E, F, G (351, 352, 354, 355, 356, 357). The stochastic segment characterization module 520 is configured to generate a respective segment template by determining a stochastic characterization of the combination of the selected related segments. A segment template provides a stochastic characterization of how a particular portion of a VSP is vocalized by the particular speaker according to a corresponding set of vocal characteristics and multiple vocalization instances of the VSP provided by the particular speaker. The stochastic segment characterization module 520 stores generated segment templates in the VSP segment template buffer 540. In some implementations, the template verification module 530 is configured to assess and characterize the quality of generated segment templates. In some implementations, segment template quality is a function of a confidence metric determined for a segment template.

Referring to the VSP map generator module 650, the selection module 610, is configured to select a segment from a vocalization instance and a corresponding segment template in order to enable mapping between the selected segment and the corresponding segment template. For example, with reference to FIG. 3, a mapping is generated between the first segment 321 ($A_2$) of the second vocalization instance 320 and the corresponding segment template A (351). A VSP segment map for a vocalization instance includes mappings between respective segments and corresponding segment templates. An example of a complete VSP segment map for the second vocalization instance 320 is shown in Table 1.0 below. Similar VSP segment maps could be produced for the other vocalization instances 310, 330, 340, but are not shown herein for the sake of brevity.

TABLE 1.0

VSP Segment Map for the Second Vocalization Instance 320

| SEGMENT | Start Frame | End Frame | Norm. Coeff |
|---|---|---|---|
| $A_2$ | 35 | 25 | 356.5761635 |
| $B_2$ | 25 | 22 | 851.4795195 |
| $C_2$ | 22 | 19 | 549.7918519 |
| $D_2$ | 19 | 13 | 811.9623005 |
| $E_2$ | 13 | 6 | 961.7435665 |
| $F_2$ | 6 | 2 | 527.6092704 |
| $G_2$ | 2 | 0 | 889.6925914 |

In some implementations, the timing characterization module 620 is configured to determine the relative start and end times (e.g., time markers) for each of two or more segments of a vocalization instance. For example, in some implementations, with reference to Table 1.0 above, the start and end time markers are provided as time values that are relative to an earliest segment start time across all vocalization instances associated with a concurrent segmentation. In some implementations, the match scoring module 630 is configured to determine a respective match score value that quantitatively characterizes how closely a segment matches a corresponding segment template. In various implementations, a VSP segment map for a vocalization instance includes segment timing characterizations and match score values for each segment of the vocalization instance. VSP segment maps are stored in the VSP segment map buffer 640.

FIG. 5 is a block diagram of the VSP match threshold determination module 700 included in the VSP detection system 100 of FIG. 1 in accordance with some implementations. Again, while pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the VSP match threshold determination module 700 includes a windowing module 711, a spectrum conversion module 712, a spectral feature extraction module 714, a noise generator 720, a raw scoring module 730, an unbiased scoring module 740, and a sigmoid center set module 750. The VSP match threshold determination module 700 also includes the training data buffer 130 (of FIG. 1), a noisy training data buffer 725, the VSP segment templates buffer 540, the VSP segment map buffer 640, a raw score buffer 735, an unbiased score buffer 745, and a sigmoid centers buffer 755.

In some implementations, the windowing module 711 is configured to mark and separate a test-training VSP vocalization instance into a set of $N_s$ temporal segments, so that the test-training VSP vocalization instance has the same number of segments as the concurrent segmentation generated by the concurrent segmentation module 200. In some implementations, the windowing module 711 configured to retrieve one or more test-training VSP vocalization instances from a non-transitory memory (e.g., the training data buffer 130).

In some implementations, the spectrum conversion module 712 is configured to generate a corresponding frequency domain representation for each of the $N_s$ segments of the test-training VSP vocalization instance. In some implementations, spectrum conversion module 712 utilizes a 32 point short-time FFT (Fast Fourier Transform). Those of ordinary skill in the art will appreciate that any number of FFT implementations are used in various implementations. Additionally and/or alternatively, the spectrum conversion module 712 may also be implemented using any suitable implementation of one or more low pass filters, such as for example, a bank of IIR filters. Additionally and/or alternatively, the spectrum conversion module 712 may also be implemented with any suitable implementation of a gamma-tone filter bank, a wavelet decomposition module, and a bank of one or more interaural intensity difference (IID) filters. In some implementations, an optional spectral filter module (not shown) is configured to receive and adjust the spectral composition of the frequency domain representations of the one or more frames. In some implementations, for example, the spectral filter module is configured to one of emphasize, deemphasize, and/or isolate one or more spectral components of a temporal frame of the audible signal in the frequency domain.

In some implementations, the spectral feature extraction module 714 is configured to identify and extract spectral features from a frequency domain representation for each of the $N_s$ segments of the test-training VSP vocalization instance. In some implementations, spectral characteristics include, without limitation, spectral centroid, spectral flux and MFCCs, in addition to other known to those of ordinary skill in the art. For example, the feature extraction module 714 includes one or more sub-modules that are configured to analyze the frames in order to obtain spectral feature characterization data. In some implementations, selected frame-wise MFCCs are stored as vector sets and indexed by respective vocalization instance identifiers corresponding to the plurality of vocalization instances of the VSP.

In some implementations, the noise generator 720 is configured to generate noise at one or more SNR level values, and/or of one or more noise types. To that end, in some implementations the noise generator 720 includes at least one of a SNR level set module 721 and a noise type set module 722. The SNR level set module 721 controls noise generation as a function of various SNR levels as instructed by a system controller (e.g., controller 120 of FIG. 1) in accordance with a training protocol provided in a non-transitory memory and/or firmware. The noise type set module 722 controls noise generation as a function of various noise types (e.g., white noise, pink noise, Brownian noise, flicker noise, power-law noise, Cauchy-noise, etc.) as instructed by the system controller.

In some implementations, the raw scoring module 730 is configured to generate a raw score posteriorgram. In accordance with various implementations, a raw score posteriorgram includes match probabilities for each segment template over time as a function SNR and/or noise type, and is generated by scoring each noisy segment against each of the segment templates. In some implementations, as each of a noisy segment and a segment template includes a vector set of spectral features, a match probability ($P_s$(segment template)) between a particular noisy segment and a particular segment template is a function of the inverse Euclidian distance between the respective vector sets. To that end, in some implementations the raw scoring module 730 includes a vector analyzer module 731, an accumulator 732, and a normalizer 733. The vector analyzer 731 (of the raw scoring module 730) determines the inverse Euclidian distance between the respective vectors in order to generate match probabilities as a function of SNR levels for each particular noise type. The accumulator 732 determines and stores accumulated raw scores for each segment template as the match probabilities are determined by the vector analyzer 731. In some implementations, this also simplifies a mean calculation (described below), because a vector summation operation can be replaced by a scalar subtraction operation. In some implementations, using accumulated scores also reduces computational complexity and memory demand. Optionally, the accumulated raw scores are normalized by the normalizer 733 in order to produce initially normalized accumulated raw scores based on the segment start and end times defined in the VSP segment maps. The accumulated raw scores (and/or normalized accumulated raw scores) are stored in the raw score buffer 735. While the example described herein includes determining match probabilities as a function of a Euclidian distance between respective vector sets, in some implementations, match probabilities are determined as a function of one or more other statistical characterizations of similarity between respective sets. For example, in some implementations, scoring is based on correlation between a particular noisy segment and a particular segment template. In some implementations, scoring is based on a function of a Mahalanobis distance between a particular noisy segment and a particular segment template. In various implementations, determining a scoring distance—such as a Euclidian distance and/or a Mahalanobis distance—is based on a weighted function. For example, in some implementations, lower cepstral coefficients are given greater weights than upper ceptral coefficients.

In some implementations, the unbiased scoring module 740 is configured to generate unbiased scores from the raw score posteriorgram values at a number of SNR levels of particular noise types. To that end, in some implementations the unbiased scoring module 740 includes a windowed mean module 741 that is configured to determine a windowed mean of a particular accumulated raw score, and then subtracts windowed mean from the accumulated raw score to produce the respective unbiased score. The unbiased score buffer 745 stores the unbiased scores determined by the unbiased scoring module 740. An example of generating an unbiased score is described in greater detail below with reference to FIGS. 6, 7A and 7B.

In some implementations, the sigmoid center set module 750 is configured to determine detection normalization threshold values at two or more known SNR levels for at least one particular noise type. In some implementations, detection normalization threshold values include SNR-dependent sigmoid center anchors values. During run-time VSP detection (as described below with reference to FIGS. 8 and 9), unbiased scores are normalized using a sigmoid function. The sigmoid function is centered such that it is proximate to where the output peak is expected to be for a detectable VSP vocalization instance within noisy audible signal data. However, since the peak of an unbiased score is a measure of how well a subsequently received sound matches the VSP, the peak height is a function of the amount and type of noise. Typically, the lower the SNR the lower the peak height of a corresponding unbiased score. As a result, for an untrained run-time detection process it would be extremely difficult to, if not impossible, accurately (unless by chance) and consistently center the sigmoid function. By contrast, in accordance with various implementations, in order to address this problem, a part of the training process includes determining SNR-dependent sigmoid center anchors (as described in FIG. 6) that are later interpreted by the run-time detection method (as described in FIG. 9) to determine a SNR-dependent sigmoid center value that is relatively consistently proximate to where the output peak is expected to be for a detectable noisy VSP vocalization instance within noisy audible signal data. To that end, in some implementations the sigmoid center set module 750 includes a peak detector 751, and a center select module 752.

The sigmoid center set module 750 selects an unbiased score for each of two or more different SNRs from the unbiased score buffer 745. The peak detector 751 identifies a corresponding peak in each respective unbiased score. The center select module 752 determines a respective sigmoid center anchor for each SNR, and stores the sigmoid center anchors in the sigmoid centers buffer 755.

Figure 6:
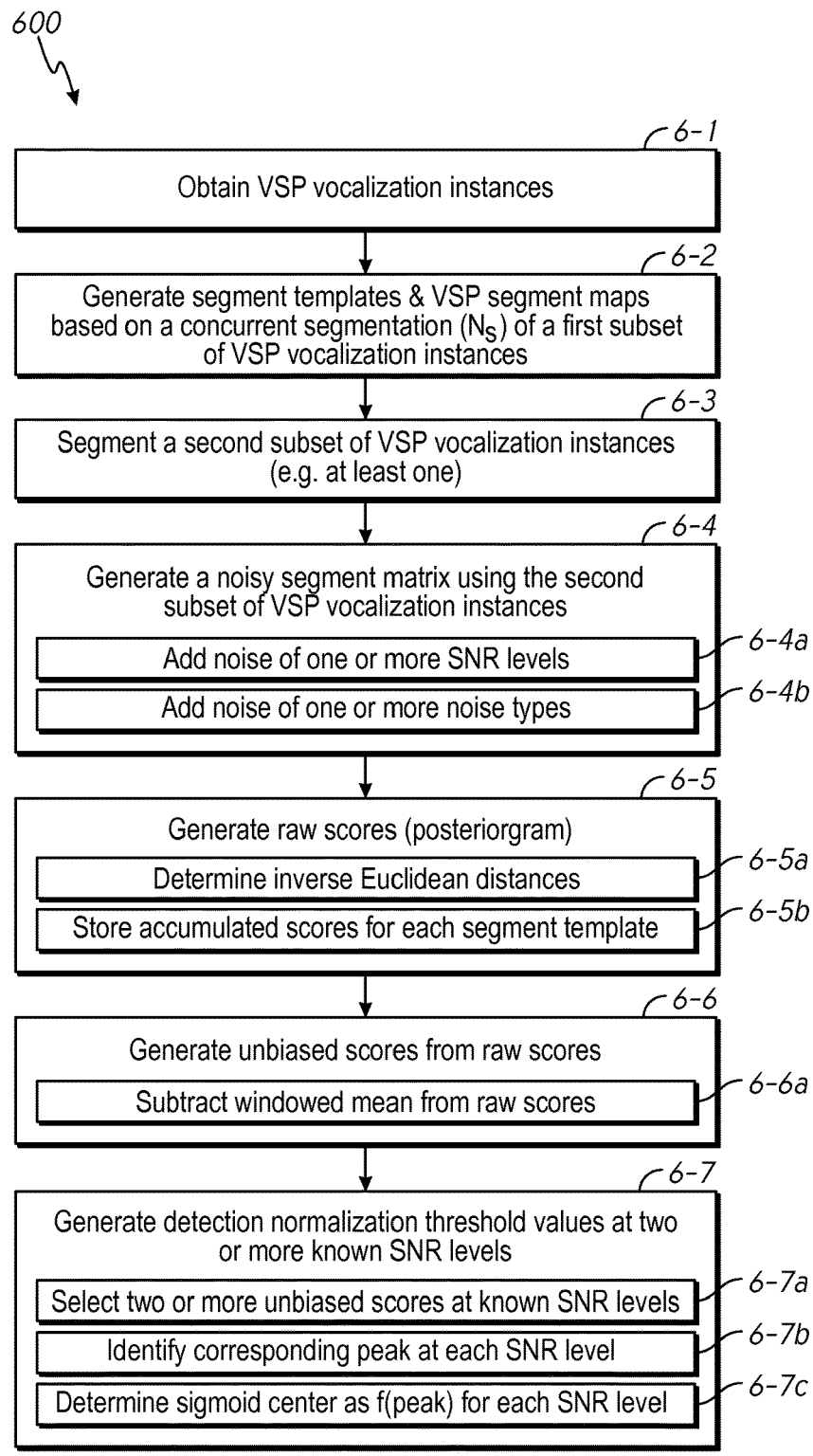
FIG. 6 is a flowchart representation of a method of generating a set of detection normalization threshold values based on multiple SNR values that characterize speaker dependent VSP detection criteria according to some implementations.

FIG. 6 is a flowchart representation of a method 600 of generating a set of detection normalization threshold values based on multiple SNR values that characterize speaker dependent VSP detection criteria in accordance with some implementations. With reference to FIGS. 1 and 5, in some implementations the method 600 is performed by the VSP match threshold determination module 700 in combination with other portions of the VSP detection system 100. Briefly, the method 600 includes using additional raw training data (e.g., at least one VSP vocalization instance) that was not included in the concurrent segmentation, VSP segment templates, and VSP segment mappings in order to produce a more reliable set of one or more detection normalization threshold values suitable for the VSP detection module 800.

To that end, as represented by block 6-1, the method 600 includes obtaining a plurality of vocalization instances of a VSP from a particular speaker, identifiable by a corresponding set of vocal characteristics. In some implementations, obtaining a plurality of vocalization instances of the VSP includes prompting an authenticated user (e.g., a particular speaker) to speak and record the plurality of vocalization instances of the VSP. For example, with reference to FIGS. 1 and 2, the UI module 121 is used to prompt the authenticated user to speak and record a plurality of vocalization instances of the VSP (e.g., the VSP includes the word "Vancouver" as spoken by a particular speaker). The training data buffer 130 stores the plurality of vocalization instances of the VSP. In some implementations, obtaining a plurality of vocalization instances of the VSP includes retrieving and/or receiving vocalization instances of the VSP associated with a particular speaker from a non-transitory memory, such as the training data buffer 130.

As represented by block 6-2, the method 600 includes generating segment templates and VSP segment maps based on a concurrent segmentation of a first subset of VSP vocalization instances. In some implementations, the method includes generates a concurrent segmentation of multiple vocalization instances of the VSP. In some implementations, the method includes retrieving and/or receiving a concurrent segmentation of multiple vocalization instances of the VSP from a non-transitory memory. Then for each of the $N_s$ segments in the concurrent segmentation, the method includes generating a respective segment template based on two or more related segments across the concurrent segmentation of the plurality of vocalization instances as described above with reference to FIG. 3. As noted above, a segment template provides a stochastic characterization of how a particular portion of a VSP is vocalized by the particular speaker according to a corresponding set of vocal characteristics and multiple vocalization instances of the VSP provided by the particular speaker. For example, with reference to FIGS. 1 and 3, the segment template generator module 500 uses the respective third segments $C_1$, $C_2$, $C_3$, $C_4$ from the corresponding vocalization instances 310, 320, 330, 340 in order to generate segment template C (353). In other words, segment template C (353) is a function of the corresponding third segments ($C_n$) from each of the vocalization instances 310, 320, 330, 340. Using the respective segment templates, the method 600 includes generating at least one VSP segment mapping between a segment of a VSP vocalization instance (in the first subset) and a segment template. Each VSP segment map provides a quantitative characterization of how respective segments of one of the plurality of vocalization instances varies in relation to a corresponding set of segment templates. For example, with reference to FIGS. 1 and 3, the VSP map generator module 650 generates a segment mapping between each of the seven segments 321, 322, 323, 324, 325, 326, 327 ($A_2$, $B_2$, $C_2$, $D_2$, $E_2$, $F_2$, $G_2$) of the second vocalization instance 320 and a corresponding one of the seven segment templates A, B, C, D, E, F, G (351, 352, 353, 354, 355, 356, 357) in order to produce a VSP segment map for the second vocalization instance 320. As noted above, an example of a complete VSP segment map for the second vocalization instance 320 is shown in Table 1.0.

As represented by block 6-3, the method 600 includes segmenting a second subset of VSP vocalization instances, which are independent of the first subset of VSP vocalization instances, in order to generate test-training segments. In some implementations, the second subset of VSP vocalization instances includes one or more VSP vocalization instances that were not used in any one of the generation of the concurrent segmentation, the generation of the segment templates, and the generation of the VSP segment maps. Moreover, for the sake of clarity, the VSP vocalization instances in the second subset are hereinafter referred to as test-training VSP vocalization instances, as described above with reference to FIG. 5. In some implementations, segmenting a second subset of VSP vocalization instances includes segmenting a single test-training VSP vocalization instance into the same number of segments, $N_s$, as in concurrent segmentation; and, converting the $N_s$ segments into a spectral feature format that is compatible with and/or the same as the spectral feature format used to generate the concurrent segmentation. For example, with reference to FIG. 5, the second subset includes one test-training VSP vocalization instance stored in the training data buffer 130. The windowing module 711 marks and separates the test-training VSP vocalization instance into a set of $N_s$ (temporal) segments, so that the test-training VSP vocalization instance has the same number of segments as the concurrent segmentation. In some implementations, the segment boundary times applied to the test-training VSP vocalization instance—by the windowing module 711—correspond to average frame boundary times associated with the VSP segment maps. In some implementations, the segment boundary times divide the test-training VSP vocalization instance into $N_s$ segments of relatively equal duration. The spectrum conversion module 712 generates a corresponding frequency domain representation for each of the $N_s$ segments. Subsequently, the spectral feature extraction module 714 identifies and extracts a corresponding vector set of spectral features from the frequency domain representation of each of the $N_s$ segments. In various implementations, the corresponding vector sets of spectral features are used in portions of the method as representing the corresponding segments of the test-training VSP vocalization instance. Additionally and/or alternatively, in some implementations, the frequency domain representations for each of the $N_s$ segments are used in portions of the method as representing the segments of the test-training VSP vocalization instance.

As represented by block 6-4, the method 600 includes generating a noisy segment matrix using the segmented second subset of VSP vocalization instances. The noisy segment matrix includes one or more noisy copies of each (vector set) segment representation (or "segment" hereinafter for brevity), that each correspond to a segment plus the addition of noise at a particular SNR level and of a particular noise type (e.g., white noise, pink noise, Brownian noise, flicker noise, power-law noise, Cauchy-noise, etc.). For example, with reference to FIG. 5, the noise generator 720 generates noise that is added to each of the respective (vector set) segments of a test-training VSP vocalization instance provided by the spectral feature extraction module 714. The resulting noisy segment matrix is stored in the noisy training data buffer 725. In some implementations, as represented by block 6-4a, generating the noisy segment matrix includes generating and adding noise at one or more SNR levels to each segment in order to produce a corresponding one or more noisy segments for each segment of a test-training VSP vocalization instance. For example, with reference to FIG. 5, the SNR level set module 721 controls noise generation as a function of various SNR levels. In some implementations, as represented by block 6-4b, generating the noisy segment matrix includes generating and adding noise of one or more noise types to each segment in order to produce a corresponding one or more noisy segments for each segment of a test-training VSP vocalization instance. For example, with reference to FIG. 5, the noise type set module 722 controls noise generation as a function of various noise types.

As represented by block 6-5, the method 600 includes generating a raw score posteriorgram. In some implementations, as represented by block 6-5a, a raw score match probability is initially determined as a function of the inverse Euclidian distance between a particular noisy segment and a particular segment template. As described above with reference to FIG. 5, the inverse Euclidian distance is determined between respective vector sets representing a noisy segment and a segment template. With reference to FIG. 5, the vector analyzer 731 (of the raw scoring module 730) determines the inverse Euclidian distance between the respective vectors in order to generate match probabilities as a function of SNR levels for each particular noise type. For example, with reference to FIG. 3, the current segmentation includes seven segments ($N_s$=7), and thus, seven segment templates A, B, C, D, E, F, G (351, 352, 353, 354, 355, 356, 357) are produced as described above. Each of the seven segment templates A, B, C, D, E, F, G (351, 352, 353, 354, 355, 356, 357) is then used to generate a corresponding match probability associated with each segment of a noisy test-training VSP vocalization instance (e.g., match probability=probability that a particular noisy segment matches a particular segment template). Because the test-training VSP vocalization instance is segmented into the same number of segments as the concurrent segmentation ($N_s$=7 in this example) a total of $N_s \times N_s$ (=49 in this example) match probabilities are generated for each test-training vocalization instance, for a particular SNR level of a particular noise type. In other words, each SNR level of a particular noise type yields $N_s \times N_s$ match probabilities. As represented by block 6-5b, in some implementations, generating the raw score posteriorgram includes determining and storing accumulated raw scores for each segment template for each combination of SNR level and noise type (e.g., accumulated score=f(SNR, noise type, segment template)). With continued reference to FIG. 5, the accumulator 732 determines and stores accumulated raw scores for each segment template as the match probabilities are determined by the vector analyzer 731, and the (normalized) accumulated raw scores are stored in the raw score buffer 735. Moreover, while the example described herein includes determining match probabilities as a function of a Euclidian distance between respective vector sets, in some implementations, match probabilities are determined as a function of one or more other statistical characterizations of similarity between respective sets. For example, in some implementations, scoring is based on correlation between a particular noisy segment and a particular segment template. In some implementations, scoring is based on a function of a Mahalanobis distance between a particular noisy segment and a particular segment template.

Figures 7A, 7B:
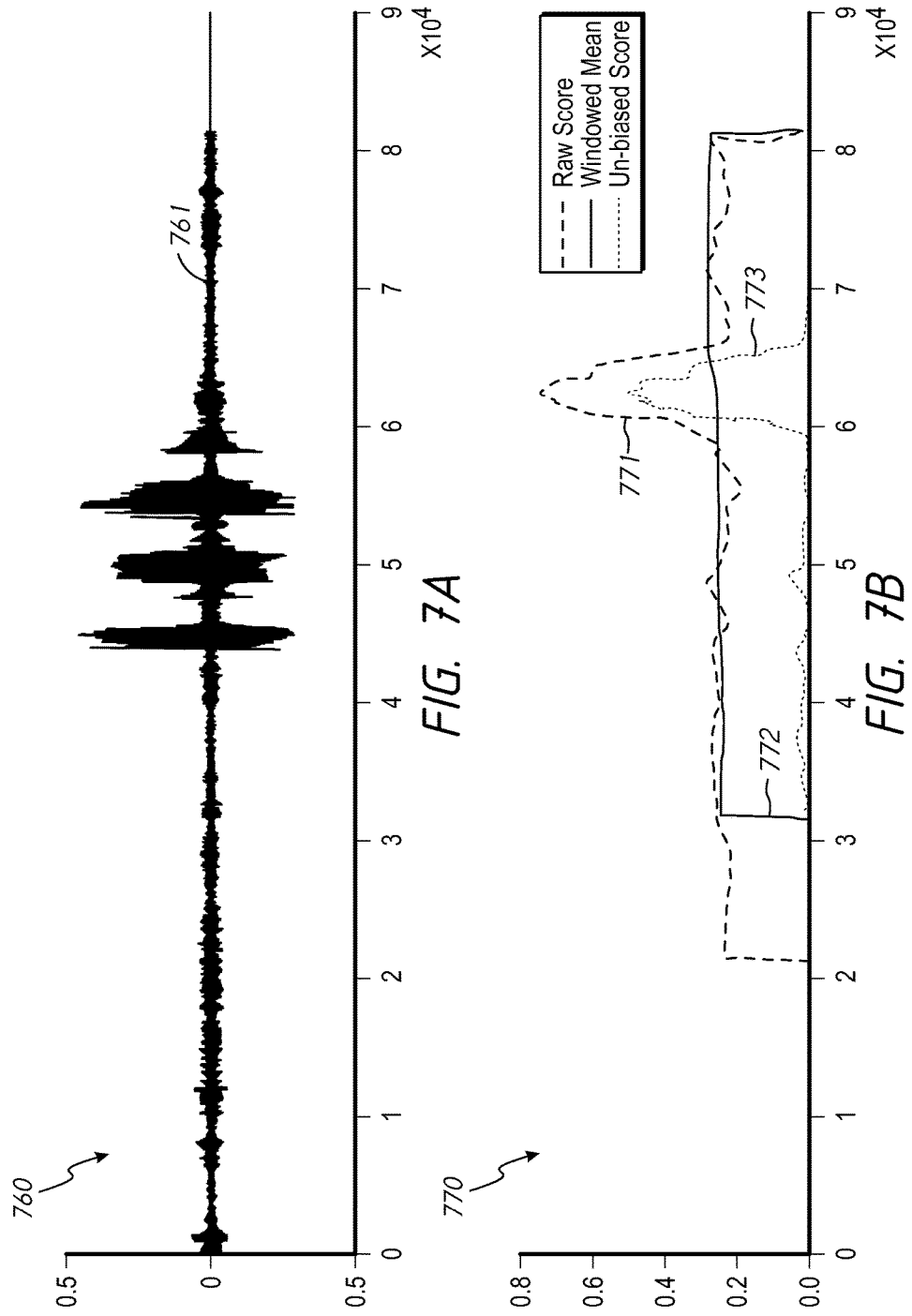
FIGS. 7A-7C are performance diagrams illustrating the extraction of VSP characterizations from audible signal data and the generation of a set of detection normalization threshold values based on multiple SNR values that characterize speaker dependent VSP detection criteria according to some implementations.

As represented by block 6-6, the method 600 includes generating unbiased scores from the raw score posteriorgram values at a number of SNR levels of particular noise types. For additional clarity, FIGS. 7A and 7B are performance diagrams 760, 770 illustrating the generation of unbiased scores from audible signal data according to some implementations. Specifically, the performance diagram 760 of FIG. 7A includes a representation of audible signal data 761 of a VSP vocalization instance in the time domain. The performance diagram 770 of FIG. 7B provides examples of an accumulated raw score 771, a corresponding windowed mean 772 (of the accumulated raw score), and an unbiased score 773. As noted above, in some implementations, accumulated raw scores are determined for each segment template, which enables the generation of unbiased scores using a scalar subtraction operation. As represented by block 6-6a, generating an unbiased score—for a particular SNR level and of a particular noise type—is determined by subtracting a windowed mean of a corresponding accumulated raw score (=f(SNR, noise type, segment template)) from the accumulated score. In some implementations, the duration of the window is approximately 2 milliseconds. However, those of ordinary skill in the art will appreciate that the duration of a window may vary based on any number of factors, and thus, in various implementations is less than or greater than 2 milliseconds. As an example, with reference to FIG. 5, the unbiased scoring module 740 includes a windowed mean module 741 that determines the windowed mean (e.g., windowed mean 772 of FIG. 7B) of a particular accumulated raw score (e.g., accumulated raw score 771 of FIG. 7B), and then subtracts windowed mean from the accumulated raw score to produce the respective unbiased score (e.g., unbiased score 773 of FIG. 7B). The unbiased score buffer 745 stores the unbiased scores determined by the unbiased scoring module 740.

Figure 7C:
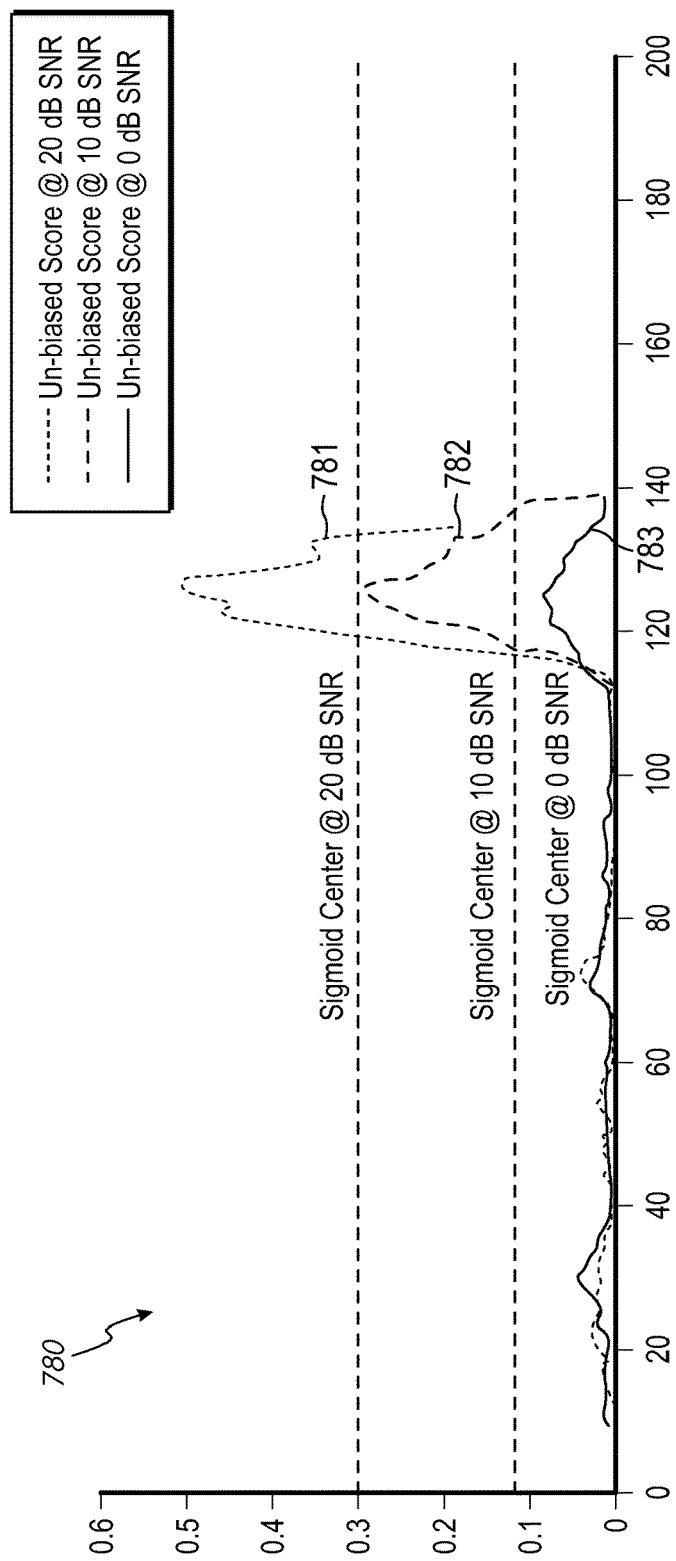

Again, as described above, unbiased scores are determined for a number of SNR levels for each of one or noise types. For example, the performance diagram 780 of FIG. 7C shows unbiased scores 781, 782, 783 determined for 20 dB SNR, 10 dB SNR, and 0 dB SNR, respectively. Also as noted above, since the peak of an unbiased score is a measure of how well a subsequently received sound matches the VSP, the peak height is a function of the amount and type of noise. For example, with continued reference to FIG. 7C, the peak heights of the unbiased scores 781, 782, 783 decreases as a function of SNR level. In accordance with various implementations, in order to address this problem, a part of the training process includes determining SNR-dependent sigmoid center anchors that are later interpreted by the run-time detection method (as described in FIG. 9) to determine a SNR-dependent sigmoid center value that is relatively consistently proximate to where the output peak is expected to be for a detectable noisy VSP vocalization instance.

To that end, as represented by block 6-7 of FIG. 6, the method 600 includes determining detection normalization threshold values at two or more known SNR levels for at least one particular noise type. In some implementations, detection normalization threshold values include SNR-dependent sigmoid center anchors values. To that end, as represented by block 6-7a, determining detection normalization threshold values includes selecting a respective unbiased score for each of two or more SNR levels. For example, with reference to FIG. 5, the sigmoid center set module 750 selects an unbiased score for each of two or more different SNRs from the unbiased score buffer 745. As represented by block 6-7b, determining detection normalization threshold values includes identifying a corresponding peak in each respective unbiased score. In other words, a peak is identified for each of the two or more SNRs. For example, with reference to FIG. 5, the peak detector 751 identifies a corresponding peak in each respective unbiased score. As represented by block 6-7c, determining detection normalization threshold values includes determining a respective sigmoid center anchor at as a function of the corresponding peak value for each SNR (e.g., sigmoid center anchor=f (peak(SNR))). For example, with reference to FIG. 5, the center select module 752 determines a respective sigmoid center anchor for each SNR. In some implementations, a respective sigmoid center is a fraction of the peak height measured at a particular SNR. In some implementations, a respective sigmoid center anchor is approximately half the peak height measured at a particular SNR. As described below with reference to FIGS. 8 and 9, the SNR-dependent sigmoid center anchors are utilized in combination with the segment templates by the run-time detection method.

Figure 8:
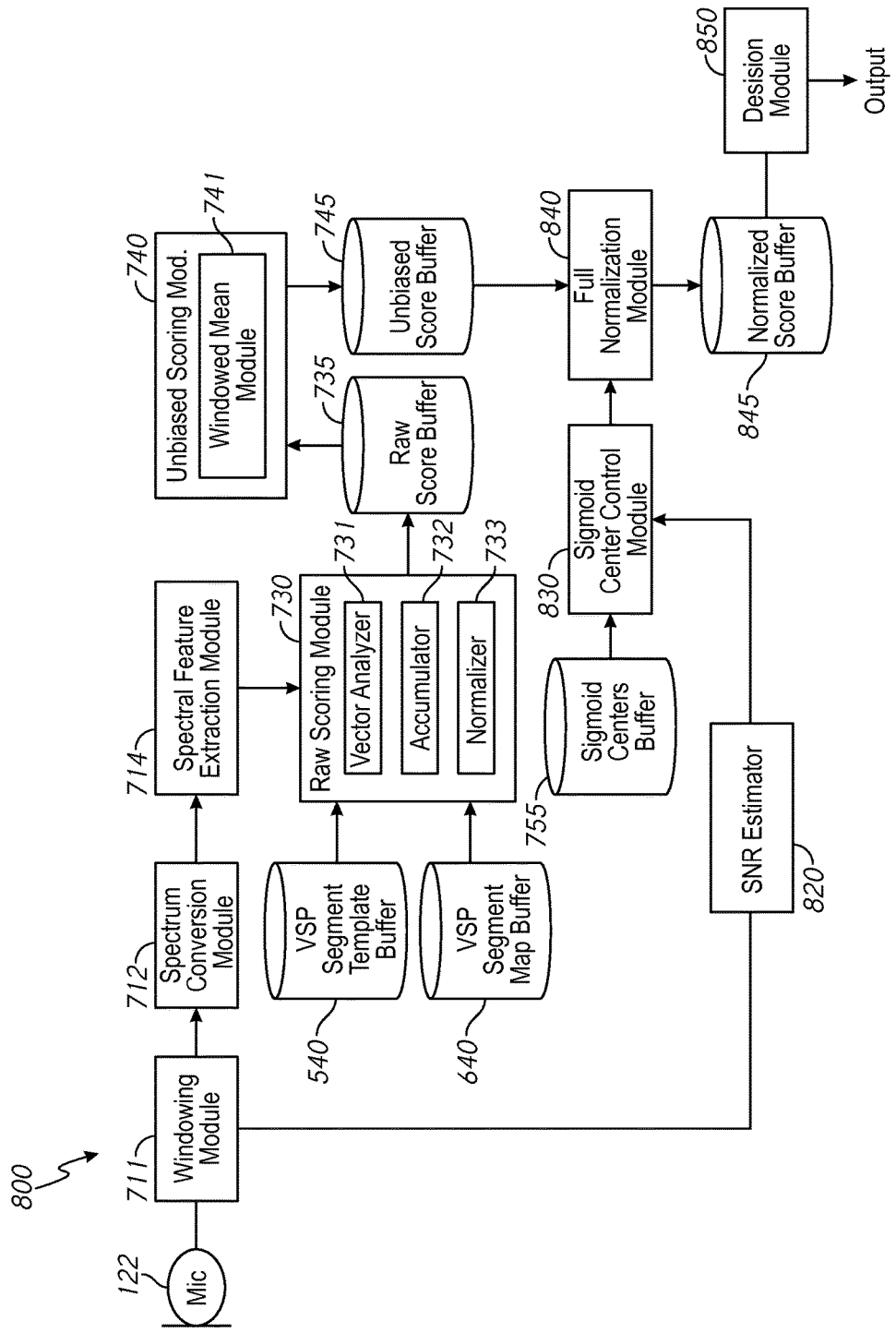
FIG. 8 is a block diagram of a VSP detection module in accordance with some implementations.

FIG. 8 is a block diagram of a (run-time) VSP detection module 800 included in the VSP detection system 100 of FIG. 1 in accordance with some implementations. The VSP detection module 800 illustrated in FIG. 8 is similar to and adapted from the VSP match threshold determination module 700 illustrated in FIG. 5. Additionally, those of ordinary skill in the art will appreciate that, even though the VSP detector module 800 and the VSP match threshold determination module 700 are illustrated as distinct modules in the example presented herein, in various implementations shared elements and/or functions can be combined into one or more sub-modules and/or further sub-divided into additional sub-modules; and, that the aforementioned sub-modules are provided as merely one example configuration of the various aspects and functions described herein. Elements common to FIGS. 5 and 8 include common reference numbers, and only the differences between FIGS. 5 and 8 are described herein for the sake of brevity.

To that end, as a non-limiting example, as compared to the VSP match threshold determination module 700, the VSP detector module 800 does not include the noise generator 720. In the run-time detection mode the VSP detector module 800 receives presumably noisy audible signal data (that possibly includes an acceptable VSP vocalization instance from a particular user) from the microphone 122 provided by some speaker. Noise does not need to be added because, unlike in the training mode, the detection mode does not rely on the audible signal data being from a particular speaker and/or including a valid VSP vocalization instance. Moreover, the detection mode is typically provided to operate in any number of real-world adverse acoustic environments, while training preferably occurs in a better acoustic environment. Rather, the VSP detector module 800 is intended to be utilized in order to determine whether or not audible signal data includes a valid VSP vocalization instance from a particular user based on speaker dependent training characterizations provided by the training module 140—such as SNR-dependent sigmoid center anchors, the VSP segment templates and the VSP segment maps. Additionally, although the MUX 123 is no shown in FIG. 8, as described above with reference to FIG. 1, in a run-time detection mode, the MUX 123 is used to couple the microphone 122 to the VSP detector module 800.

Also, as compared to the VSP match threshold determination module 700, the VSP detector module 800 also includes an SNR estimator 820, a sigmoid center control module 830, a full normalization module 840, a normalized score buffer 845, and a decision module 850.

In some implementations, the SNR estimator 820 is configured to determine an SNR estimate value for each segment of audible signal data provided by the windowing module 711.

In some implementations, the sigmoid center control module 830 is configured to interpret SNR-dependent sigmoid center anchors determined during the training process in order to generate a sigmoid center value associated with a particular SNR estimate value. To that end, the sigmoid center control module 830 is configured to retrieve two or more of the SNR-dependent sigmoid center anchors from the buffer 755. And subsequently, determine a respective sigmoid center value associated with a corresponding SNR estimate value based on an interpretations of the two or more of the SNR-dependent sigmoid center anchors. More specifically, in some implementations, two or more of the SNR-dependent sigmoid center anchors determined during the training process are used in a curve fitting process in combination with a SNR estimate value in order to determine a sigmoid center value specifically associated with the SNR estimate value. In some implementations, the sigmoid center value associated with the SNR estimate value is determined based on a linear interpretation of two or more of the SNR-dependent sigmoid center anchors determined during the training process. In some implementations, the full normalization module 840 is configured to normalize unbiased scores by applying a sigmoid function centered using sigmoid center values determined by the sigmoid center control module 830. The full normalization module 840 is also configured to store the normalized scores in the normalized score buffer 845.

In some implementations, the decision module 850 is configured to assess the normalized score(s) in order to determine whether or not noisy audible signal data, received from the microphone 122, includes a vocalization instance of the particular VSP as vocalized by the particular speaker that trained the VSP detection system 100. To that end, in some implementations, the decision module 850 is configured to produce a positive detection result when a normalized score breaches a threshold level.

Figure 9:
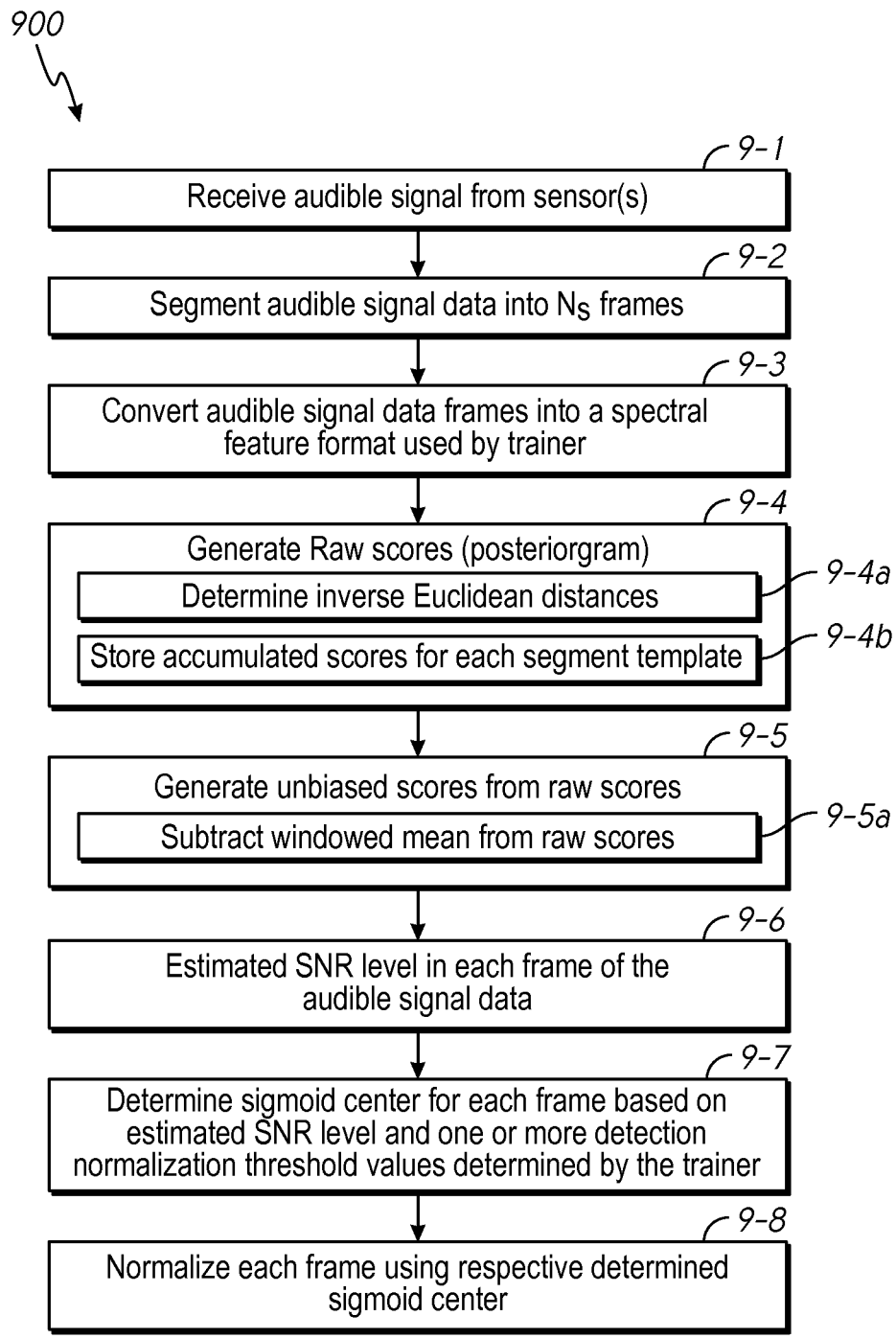
FIG. 9 is a flowchart representation of a method of detecting a VSP as vocalized by a particular speaker in accordance with some implementations.

FIG. 9 is a flowchart representation of a method 900 of detecting a VSP as vocalized by a particular speaker in accordance with some implementations. With reference to FIGS. 1 and 8, in some implementations the method 900 is performed by the VSP detection module 800 in combination with other portions of the VSP detection system 100. Briefly, the method 900 includes receiving audible signal data, and determining whether or not the audible signal data includes an acceptable vocalization instance of a VSP as vocalized by a particular user based on speaker dependent training characterizations provided by the training module 140, such as SNR-dependent sigmoid center anchors, the VSP segment templates and the VSP segment maps.

To that end, as represented by block 9-1, the method 900 includes receiving audible signal data from one or more audio sensors. In some implementations, receiving audible signal data includes receiving a time domain audible signal (e.g., a time series) from a microphone and converting the time domain audible signal into the frequency domain. For example, with reference to FIGS. 1 and 8, in the run-time detection mode the VSP detector module 800 receives audible signal data from the microphone 122. In some implementations, receiving the audible signal data includes receiving a frequency domain representation of the audible signal data, from for example, another device and/or a memory location.

As represented by block 9-2, the method 900 includes segmenting the audible signal data into the same number of segments (or frames), $N_s$, as in concurrent segmentation generated during a training mode for a particular VSP. For example, the windowing module 711 marks and separates the audible signal data (from the microphone 122) into a set of $N_s$ (temporal) segments. In some implementations, the segment boundary times applied to the audible signal data—by the windowing module 711—correspond to average frame boundary times associated with VSP segment maps for the particular VSP determined during the training mode. In some implementations, the segment boundary times divide the audible signal data into $N_s$ segments of relatively equal duration.

As represented by block 9-3, the method 900 includes converting the audible signal data frames into a spectral feature format that is compatible with and/or the same as the spectral feature format used to produce the speak dependent training characterizations. For example, with reference to FIG. 8, the spectrum conversion module 712 generates a corresponding frequency domain representation for each of the $N_s$ segments of the audible signal data. Subsequently, the spectral feature extraction module 714 identifies and extracts a corresponding vector set of spectral features from the frequency domain representation of each of the $N_s$ segments.

In some implementations, the method includes scoring segments of audible signal data against the segment templates in order to generate a corresponding match score for each segment position. To that end, as represented by block 9-4, the method 900 includes generating a raw score posteriorgram using the segments of the audible signal data. In some implementations, as represented by block 9-4a, a raw score match probability is initially determined as a function of the inverse Euclidian distance between a particular segment of the audible signal data and a particular segment template. Similar to the training mode described above, the inverse Euclidian distance is determined between respective vector sets representing a segment of the audible signal data and a segment template. With reference to FIG. 8, the vector analyzer 731 (of the raw scoring module 730) determines the inverse Euclidian distance between the respective vector sets in order to generate match probabilities between each segment of the audible signal data and each segment template—resulting in a total of $N_s \times N_s$ match probabilities for the set of segments of the audible signal data. As represented by block 9-4b, in some implementations, generating the raw score posteriorgram includes determining and storing accumulated raw scores for each segment template based on match probabilities with each of the segments of the audible signal data (e.g., accumulated score=f(audible signal data segment, segment template)). With continued reference to FIG. 8, the accumulator 732 determines and stores accumulated raw scores for each segment template as the match probabilities are determined by the vector analyzer 731, and the (normalized) accumulated raw scores are stored in the raw score buffer 735. Moreover, while the example described herein includes determining match probabilities as a function of a Euclidian distance between respective vector sets, in some implementations, match probabilities are determined as a function of one or more other statistical characterizations of similarity between respective sets. For example, in some implementations, scoring is based on correlation between a particular segment of the audible signal data and a particular segment template. In some implementations, scoring is based on a function of a Mahalanobis distance between a particular segment of the audible signal data and a particular segment template.

As represented by block 9-5, the method 900 includes generating unbiased scores from the raw score posteriorgram values. As noted above, in some implementations, accumulated raw scores are determined for each segment template, which enables the generation of unbiased scores using a scalar subtraction operation. As represented by block-9-5a, generating an unbiased score is determined by subtracting a windowed mean of a corresponding accumulated raw score from the accumulated score for each segment template. As an example, with reference to FIG. 8, the windowed mean module 741 determines the windowed mean (e.g., windowed mean 772 of FIG. 7B) of a particular accumulated raw score (e.g., accumulated raw score 771 of FIG. 7B), and then subtracts windowed mean from the accumulated raw score to produce the respective unbiased score (e.g., unbiased score 773 of FIG. 7B). The unbiased score buffer 745 stores the unbiased scores determined by the unbiased scoring module 740.

In some implementations, the method includes determining a corresponding detection normalization threshold value for each segment position of the audible signal data based on a respective (signal-to-noise) SNR estimate value associated with each segment of the audible signal data; and normalizing the match score for each segment position based on a function of the detection normalization threshold value. As noted above, during VSP detection unbiased scores are normalized using a sigmoid function, which is centered such that it is proximate to where the output peak is expected to be for a detectable VSP vocalization instance within noisy audible signal data. In accordance with various implementations, the method 900 interprets SNR-dependent sigmoid center anchors—determined during a training process as described in FIG. 6—in order to determine a SNR-dependent sigmoid center value that is relatively consistently proximate to where the output peak is expected to be for a detectable VSP vocalization instance within noisy audible signal data. To that end, as represented by block 9-6, the method 900 includes estimating the SNR level in each segment of the audible signal data. For example, with reference to FIG. 8, the SNR estimator determines an SNR estimate value for each segment of the audible signal data provided by the windowing module 711.

As represented by block 9-7, the method 900 includes determining the sigmoid center for each of the segment positions of the audible signal data based on the corresponding SNR estimate values and the SNR-dependent sigmoid center anchors determined during the training process. On a per segment basis, the SNR-dependent sigmoid center anchors determined during the training process are interpreted using a corresponding SNR estimate value in order to generate a sigmoid center value associated with the SNR estimate value. For example, with reference to FIG. 8, the sigmoid center control module 830 retrieves two or more of the SNR-dependent sigmoid center anchors from the buffer 755, and determines a respective sigmoid center value associated with a corresponding SNR estimate value based on an interpretations of the two or more of the SNR-dependent sigmoid center anchors.

As represented by block 9-8, the method 900 includes normalizing the unbiased scores for each segment of the audible signal data by applying a sigmoid function centered using the determined sigmoid center values. For example, with reference to FIG. 8, the full normalization module 840 normalizes the unbiased scores (stored in buffer 745) using the sigmoid center values determined by the sigmoid center control module 830. The normalized score buffer 845 stores the normalized scores, which are utilized by the detection module 850 in order to determine whether or not a VSP vocalization instance is present in the audible signal data.

Figure 10:
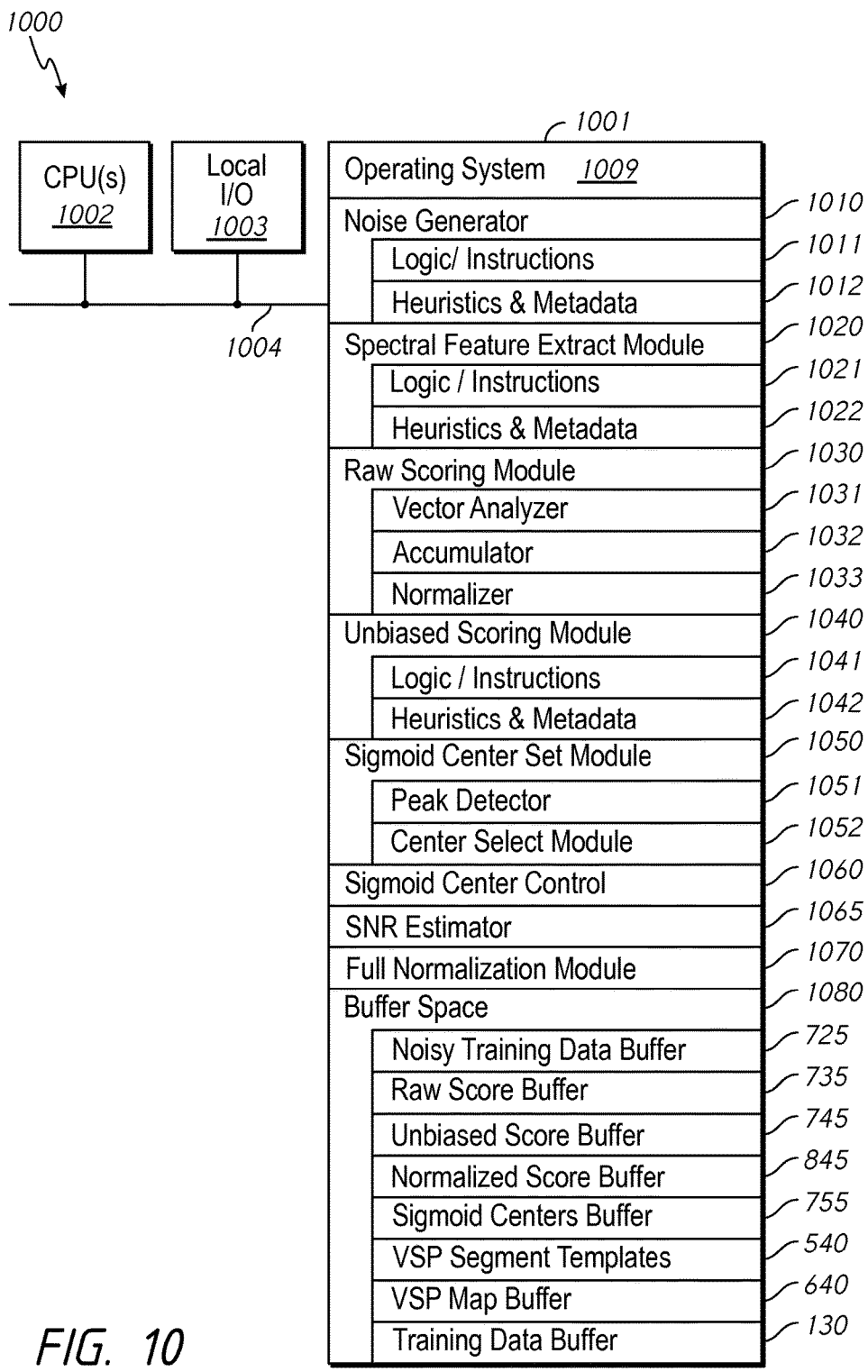
FIG. 10 is a schematic diagram of a system configured to generate a set of detection normalization threshold values based on multiple SNR values, and detect a VSP as vocalized by a particular speaker in accordance with some implementations.

FIG. 10 is a schematic diagram of a VSP detection system 1000 configured to generate a set of detection normalization threshold values based on multiple SNR values, and detect a VSP as vocalized by a particular speaker in accordance with some implementations. The VSP detection system 1000 illustrated in FIG. 10 is similar to and adapted from the VSP detection system 100 illustrated in FIG. 1, as well as the modules 200, 700 and 800 illustrated in FIGS. 2, 5 and 8. Elements common to each include common reference numbers, and only the differences between FIGS. 2, 5, 8 and 10 are described herein for the sake of brevity. Moreover, while pertinent features are illustrated, those skilled in the art will appreciate from the present disclosure that various other features have not been illustrated for the sake of brevity and so as not to obscure more pertinent aspects of the example implementations disclosed herein.

To that end, as a non-limiting example, in some implementations the VSP detection system 1000 includes one or more processing units (CPU's) 1002, one or more local I/O (input/output) interfaces 1003, an allocation of programmable logic and/or non-transitory memory (local storage) 1001, and one or more communication buses 1004 for interconnecting these and various other components not illustrated for the sake of brevity.

In some implementations, the communication buses 1004 include circuitry that interconnects and controls communications between components. In various implementations the programmable logic and/or non-transitory memory 1001 includes a suitable combination of a programmable gate array (such as an FPGA or the like), high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The programmable logic and/or non-transitory memory 1001 optionally includes one or more storage devices remotely located from the CPU(s) 1002. The programmable logic and/or non-transitory memory 1001 comprises a non-transitory computer readable storage medium. In some implementations, the programmable logic and/or non-transitory memory 1001 includes the following programs, modules and data structures, or a subset thereof including an optional operating system 1009, a noise generator 1010, a spectral feature extraction module 1020, a raw scoring module 1030, an unbiased scoring module 1040, a sigmoid center set module 1050, a sigmoid control module 1060, a full normalization module 1070 and a buffer space 1080.

The operating system 1009 includes procedures for handling various basic system services and for performing hardware dependent tasks. In some implementations, the operating system 1009 includes some or all of an operating system executed by the CPU(s) 1002.

In some implementations, the noise generator 1010 is configured to generate noise at one or more SNR level values, and/or of one or more noise types (as described above with reference to FIG. 5). To that end, the noise generator 1010 includes computer program instructions and/or logic 1011, and heuristics and metadata 1012.

In some implementations, the spectral feature extraction module 1020 is configured to identify and extract spectral features from a frequency domain representation for each of the $N_s$ segments of the test-training VSP vocalization instance (as described above with reference to FIG. 5). To that end, the noise generator 1020 includes computer program instructions and/or logic 1021, and heuristics and metadata 1022.

In some implementations, the raw scoring module 1030 is configured to generate a raw score posteriorgram (as described above with reference to FIG. 5). To that end, in some implementations the raw scoring module 1030 includes a vector analyzer module 1031, an accumulator 1032, and a normalizer 1033 (as described above with reference to FIG. 5).

In some implementations, the unbiased scoring module 1040 is configured to generated unbiased scores from the raw score posteriorgram values at a number of SNR levels of particular noise types (as described above with reference to FIG. 5). To that end, the unbiased scoring module 1040 includes computer program instructions and/or logic 1041, and heuristics and metadata 1042.

In some implementations, the sigmoid center set module 1050 is configured to determine detection normalization threshold values at two or more known SNR levels for at least one particular noise type (as described above with reference to FIG. 5). To that end, in some implementations the sigmoid center set module 1050 includes a peak detector 1051, and a center select module 1052.

In some implementations, the sigmoid center control module 1060 is configured to interpret SNR-dependent sigmoid center anchors determined during the training process in order to generate a sigmoid center value associated with a particular SNR estimate value (as described above with reference to FIG. 8).

In some implementations, the SNR estimator 1065 is configured to determine an SNR estimate value for each segment of audible signal data provided by a windowing module (as described above with reference to FIG. 8).

In some implementations, the full normalization module 1070 is configured to normalize unbiased scores by applying a sigmoid function centered using sigmoid center values determined by the sigmoid center control module 1060 (as described above with reference to FIG. 8).

In some implementations, the buffer space 1080 includes the training data buffer 130, the VSP segment templates buffer 540, the VSP segment map buffer 640, the noisy training data buffer 725, the raw score buffer 735, the unbiased score buffer 745, the sigmoid centers buffer 755, and the normalized score buffer 845.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method of determining a set of detection normalization threshold values associated with speaker dependent voiced sound pattern (VSP) detection, the method comprising:
    converting, at one or more audio sensors, an audible signal into electronic audible signal data;
    obtaining, from the electronic audible signal data, a common set of segment templates characterizing a concurrent segmentation of a first subset of a plurality of vocalization instances of a VSP, wherein each segment template provides a stochastic characterization of how a particular portion of the VSP is vocalized by a particular speaker, wherein at least a subset of the first subset of the plurality of vocalization instances are divided into the same number of segments as one other;
    synthesizing a noisy segment matrix using a second subset of the plurality of vocalization instances of the VSP, wherein the noisy segment matrix includes one or more noisy copies of segment representations of the second subset of the plurality of vocalization instances of the VSP;
    scoring segments from the noisy segment matrix against the common set of segment templates, wherein utilizing the common set of segment templates for scoring the segments reduces resource utilization associated with scoring the segments;
synthesizing detection normalization threshold values at two or more known SNR levels for at least one particular noise type based on a function of the scoring; and
outputting the detection normalization threshold values to a non-transitory memory through an output device.

2. The method of claim 1, wherein each of the plurality of vocalization instances of the VSP has vocal characteristics of the particular speaker.

3. The method of claim 1, wherein the second subset is substantially independent of the first subset.

4. The method of claim 1, wherein obtaining the common set of segment templates includes:
selecting two or more related segments within a respective segment position across the concurrent segmentation of the first subset of the plurality of vocalization instances of the VSP; and
determining the respective segment template by determining a function of spectral features of the selected two or more related segments.

5. The method of claim 1, wherein synthesizing the noisy segment matrix includes:
segmenting the second subset of the plurality of vocalization instances of the VSP in order to generate test-training segments; and
generating one or more noisy copies of each of the test-training segments by at least one of adding noise at one or more signal-to-noise (SNR) levels and adding noise of one or more noise types to each of the test-training segments.

6. The method of claim 5, wherein segmenting the second subset of the plurality of vocalization instances of the VSP includes segmenting a single test-training VSP vocalization instance into the same number of segments, $N_s$, as in concurrent segmentation of the first subset.

7. The method of claim 6, wherein segmenting the second subset of the plurality of vocalization instances of the VSP includes converting the $N_s$ segments into a spectral feature format that is compatible with the spectral feature format used to generate the concurrent segmentation of the first subset.

8. The method of claim 1, wherein scoring segments from the noisy segment matrix against the common set of segment templates includes generating raw score match probabilities as a function of one or more statistical similarity characterizations between noisy copies of segment representations and the common set of segment templates.

9. The method of claim 8, wherein generating the raw score match probabilities includes determining the inverse Euclidian distance between a particular noisy copy of a segment representation and a particular segment template.

10. The method of claim 9, wherein the inverse Euclidian distance is determined between respective vector sets representing a particular noisy copy of a segment representation and a particular segment template.

11. The method of claim 8, wherein generating the raw score match probabilities includes determining the Mahalanobis distance between a particular noisy copy of a segment representation and a particular segment template.

12. The method of claim 8, wherein scoring segments from the noisy segment matrix against the segment templates includes generating a raw score posteriorgram, wherein the raw score posteriorgram includes match probabilities between the noisy copies of the segment representations and the common set of segment templates.

13. The method of claim 8, wherein generating the raw score match probabilities includes generating an accumulated score for each segment template for each combination of SNR level and noise type.

14. The method of claim 8, wherein scoring segments from the noisy segment matrix against the common set of segment templates includes generating unbiased scores from the raw score match probabilities at a number of SNR levels for at least one particular noise type by subtracting a windowed mean of an accumulated score from the accumulated score.

15. The method of claim 1, wherein synthesizing the detection normalization threshold values at two or more known SNR levels for at least one particular noise type based on a function of the scoring includes:
selecting a respective unbiased score for each of two or more SNR levels;
identifying a corresponding peak in each respective unbiased score; and
determining a respective sigmoid center anchor as a function of the corresponding peak value for each SNR, wherein each detection normalization threshold value includes a respective sigmoid center anchor.

16. A system provided to determine a set of detection normalization threshold values associated with speaker dependent voiced sound pattern (VSP) detection, the system comprising:
one or more audio sensors configured to convert an audible signal into electronic audible signal data;
a processor; and
a non-transitory memory including instructions which, when executed by the processor, cause the system to:
synthesize, based on the electronic audible signal data, match probabilities as a function of one or more statistical similarity characterizations between noisy copies of segment representations and common segment templates, wherein the common segment templates characterize a concurrent segmentation of a first subset of a plurality of vocalization instances of a VSP, wherein at least a subset of the first subset of the plurality of vocalization instances are divided into the same number of segments as one other, and each of the segment representations are associated with a second subset of the plurality of vocalization instances of the VSP, wherein utilizing the common segment templates for synthesizing the match probabilities reduces resource utilization associated with synthesizing the match probabilities;
synthesize unbiased scores from raw score match probabilities at a number of (signal-to-noise) SNR levels of at least one particular noise type;
synthesize detection normalization threshold values at two or more known SNR levels for at least one particular noise type based on the unbiased scores; and
output the detection normalization threshold values to the non-transitory memory through an output device.

* * * * *